(12) United States Patent
Kim

(10) Patent No.: US 8,532,707 B2
(45) Date of Patent: Sep. 10, 2013

(54) MOBILE TERMINAL HAVING MULTIPLE SUBSCRIBER IDENTITY MODULES (SIMS) WITH DIFFERENT PHONE NUMBERS

(75) Inventor: Haesun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 13/082,036

(22) Filed: Apr. 7, 2011

(65) Prior Publication Data
US 2012/0094718 A1    Apr. 19, 2012

(30) Foreign Application Priority Data
Oct. 15, 2010    (KR) .................. 10-2010-0100647

(51) Int. Cl.
*H04B 1/38*    (2006.01)

(52) U.S. Cl.
USPC ............. 455/558; 455/432.3; 455/435.3; 455/559; 455/560

(58) Field of Classification Search
USPC ............. 455/432.3, 435.3, 558–560
See application file for complete search history.

(56) References Cited

U.S. PATENT DOCUMENTS

| 5,987,325 | A | * | 11/1999 | Tayloe ........................ 455/435.2 |
| 8,391,211 | B2 | * | 3/2013 | Huang et al. ................... 370/328 |
| 2005/0075106 | A1 | * | 4/2005 | Jiang ........................... 455/432.3 |
| 2011/0287807 | A1 | * | 11/2011 | Jung et al. ..................... 455/557 |
| 2012/0027003 | A1 | * | 2/2012 | Chin et al. ..................... 370/342 |
| 2012/0028657 | A1 | * | 2/2012 | Chin et al. ..................... 455/458 |
| 2012/0088501 | A1 | * | 4/2012 | Chin et al. ..................... 455/433 |

* cited by examiner

*Primary Examiner* — Amancio Gonzalez
(74) *Attorney, Agent, or Firm* — Birch, Stewart, Kolasch & Birch, LLP

(57) ABSTRACT

A mobile terminal and a method of controlling the same are provided. In accordance with another aspect of the present invention, a mobile terminal includes a plurality of user identify modules (SIMs) corresponding to different phone numbers, and a controller configured to perform control, when a plurality of calls including at least a first call and a second call corresponding to each of at least two of the plurality of SIMs are simultaneously received, the received plurality of calls to perform a first operation of connecting a first call of the received plurality of calls and a second operation of entering a chat mode with another party corresponding to a the second call of the received plurality of calls different from the first call.

14 Claims, 42 Drawing Sheets

MOBILE TERMINAL HAVING MULTIPLE SUBSCRIBER IDENTITY MODULES (SIMS) WITH DIFFERENT PHONE NUMBERS

CROSS-REFERENCE TO RELATED APPLICATION

This application claims the priority benefit to Korean Application No. 10-2010-0100647, filed on Oct. 15, 2010, the contents of which are hereby incorporated by reference herein in their entirety.

BACKGROUND

1. Field

The present invention relates to a mobile terminal in which a plurality of user identity modules are mounted and a method of controlling the same.

2. Background

When conventional mobile terminals in which a plurality of user identity modules corresponding to different phone numbers are mounted simultaneously receives calls to phone numbers corresponding to each user identity module, the conventional mobile terminals do not provide a function and a user interface that can efficiently control the simultaneously received calls.

SUMMARY

The present invention has been made in view of the above problems, and provides a mobile terminal and a method of controlling the same that can provide a function and a user interface that can efficiently control simultaneously received calls when calls are simultaneously received to a plurality of phone numbers corresponding to each of a plurality of user identity modules corresponding to different phone numbers.

The object of the present invention is not limited to the above-described objects and the other objects will be understood by those skilled in the art from the following description.

In accordance with a first aspect of the present invention, a mobile terminal includes: a plurality of user identify modules (SIM) corresponding to different phone numbers; and a controller configured to control, when a plurality of calls corresponding to each of at least two of the plurality of SIMs are simultaneously received, the received plurality of calls to perform a first operation of connecting a first call of the received plurality of calls and a second operation of entering a chat mode with another party corresponding to a second call different from the first call.

In accordance with a second aspect of the present invention, a mobile terminal includes: a plurality of SIMs corresponding to different phone numbers; and a controller configured to provide, when a plurality of calls corresponding to each of at least two of the plurality of SIMs are simultaneously received, a user interface for controlling to enter a chat mode with another party corresponding to one of the received plurality of calls.

In accordance with a third aspect of the present invention, a mobile terminal includes: a plurality of SIMs corresponding to different phone numbers; and a controller configured to differently set, when a plurality of calls corresponding to each of at least two of the plurality of SIMs are simultaneously received, audio passes for performing each of a first call and a second call of the plurality of calls.

In accordance with a fourth aspect of the present invention, a mobile terminal includes: a plurality of SIMs corresponding to different phone numbers; and a controller configured to output, when a plurality of calls corresponding to each of at least two of the plurality of SIMs are simultaneously received, a first ring tone different from a second ring tone, wherein the second ring tone is set for notifying a user when each of the received plurality of calls is individually received.

In accordance with a fifth aspect of the present invention, a method of controlling a mobile terminal having a plurality of SIMs corresponding to different phone numbers, the method includes: simultaneously receiving a plurality of calls corresponding to each of at least two of the plurality of SIMs; and performing a first operation of connecting a first call of the received plurality of calls and a second operation of entering a chat mode with another party corresponding to a second call different from the first call.

In accordance with a sixth aspect of the present invention, a method of controlling a mobile terminal having a plurality of SIMs corresponding to different phone numbers, the method includes: simultaneously receiving a plurality of calls corresponding to each of at least two of the plurality of SIMs; and providing a user interface for controlling to enter a chat mode with another party corresponding to one of the received plurality of calls.

In accordance with a seventh aspect of the present invention, a method of controlling a mobile terminal having a plurality of SIMs corresponding to different phone numbers, the method includes: simultaneously receiving a plurality of calls corresponding to each of at least two of the plurality of SIMs; and differently setting audio passes for performing each of a first call and a second call of the plurality of calls.

In accordance with an eighth aspect of the present invention, a method of controlling a mobile terminal having a plurality of SIMs corresponding to different phone numbers, the method includes: simultaneously receiving a plurality of calls corresponding to each of at least two of the plurality of SIMs; and outputting a first ring tone different from a second ring tone, wherein the second ring tone is set for notifying a user when each of the received plurality of calls is individually received.

In accordance with an aspect of the present invention, a mobile terminal includes a plurality of user identify modules (SIMs) corresponding to different phone numbers, and a controller configured to perform control, when a plurality of calls including at least a first call and a second call corresponding to each of at least two of the plurality of SIMs are simultaneously received, the received plurality of calls to perform a first operation of connecting a the first call of the received plurality of calls and a second operation of entering a chat mode with another party corresponding to a the second call of the received plurality of calls different from the first call.

In accordance with another aspect of the present invention, a mobile terminal includes a plurality of user identify modules (SIMs) corresponding to different phone numbers, and a controller configured to differently set audio passes for performing each of a first call and a second call of a plurality of calls, when the plurality of calls including the first call and the second call corresponding to at least two of the plurality of SIMs are simultaneously received when the first and second calls are received or prior to receiving the first and second calls, wherein the audio passes correspond to paths for outputting an audio signal of the received plurality of calls.

In accordance with another aspect of the present invention, a method of controlling a mobile terminal having a plurality of user identify modules (SIMs) corresponding to different phone numbers includes simultaneously receiving, via the mobile terminal, a plurality of calls including a first call and a second call corresponding to each of at least two of the plurality of SIMs, and performing, via the mobile terminal, a first operation of connecting a the first call of the received plurality of calls and a second operation of entering a chat mode with another party corresponding to a the second call of the received plurality of calls different from the first call.

In accordance with another aspect of the present invention, a method of controlling a mobile terminal having a plurality of user identify modules (SIMs) corresponding to different phone numbers includes simultaneously receiving, via the mobile terminal, a plurality of calls including a first call and a second call corresponding to at least two of the plurality of SIMs, and differently setting audio passes for performing each of the first call and the second call of the plurality of calls when the first and second calls are received or prior to receiving the first and second calls, wherein the audio passes correspond to paths for outputting an audio signal of the received plurality of calls.

BRIEF DESCRIPTION OF THE DRAWINGS

Exemplary embodiments of the present invention may be described in detail with reference to the following drawings in which like reference numerals refer to like elements and wherein.

DETAILED DESCRIPTION

Figure 1:
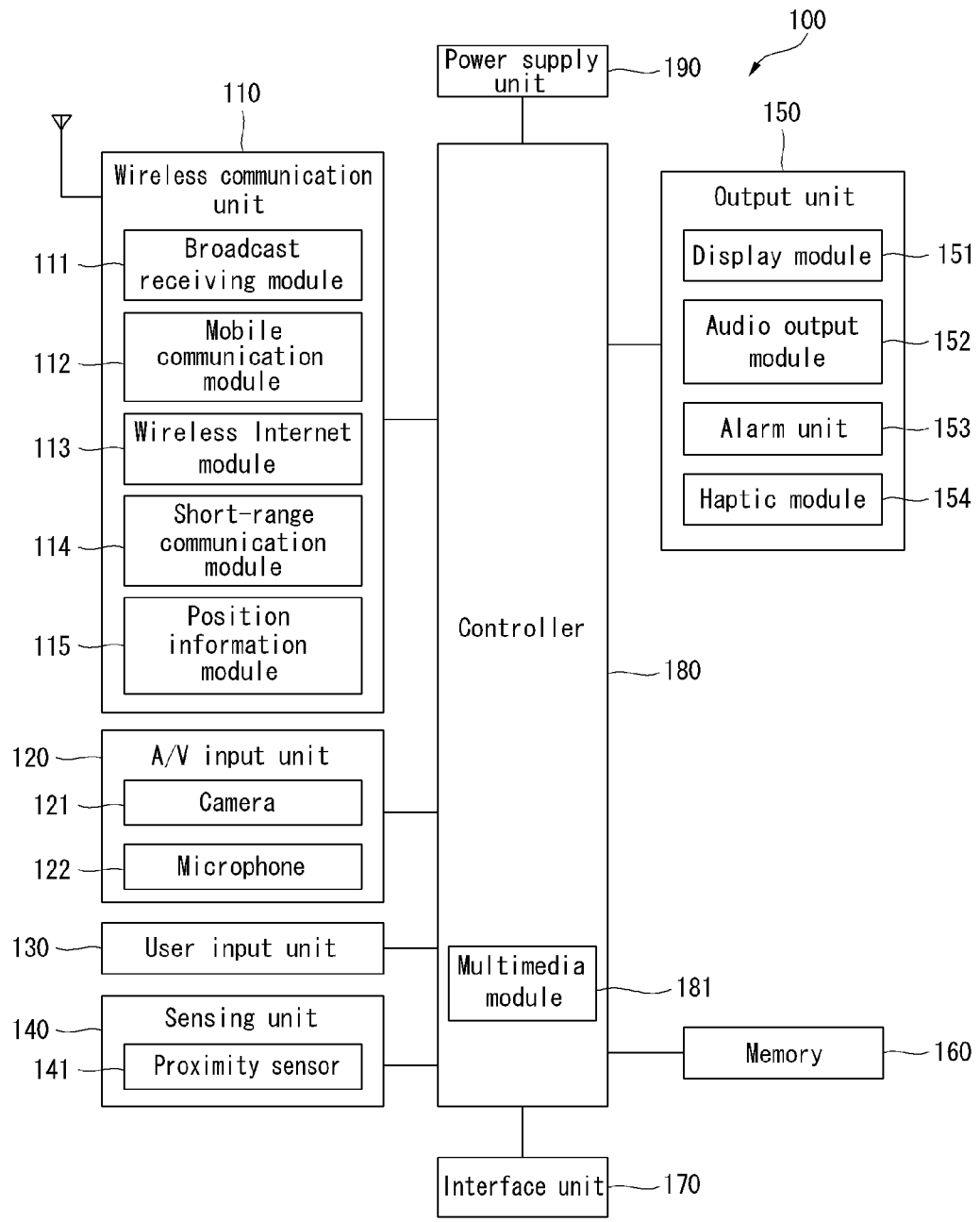
FIG. 1 is a block diagram illustrating a configuration of a mobile terminal according to an exemplary embodiment of the present invention.

These and other objects of the present application will become more readily apparent from the detailed description given hereinafter. Hereinafter, exemplary embodiments of the present invention are described in detail with reference to the accompanying drawings. Like reference numerals designate like elements throughout the specification. Detailed descriptions of well-known functions and structures incorporated herein may be omitted to avoid obscuring the subject matter of the present invention.

Hereinafter, a mobile terminal according to the present invention will be described in detail with reference to the accompanying drawings. The suffixes 'module', 'unit', and 'part' may be used for elements in order to facilitate the disclosure. Significant meanings or roles may not be given to the suffixes themselves and it is understood that the 'module', 'unit', and 'part' may be used together or interchangeably.

A mobile terminal described in this specification may include a mobile phone, a smart phone, a laptop computer, a digital broadcasting terminal, a personal digital assistants (PDA), a portable multimedia player (PMP), and a navigating device.

FIG. 1 is a block diagram illustrating a configuration of a mobile terminal according to an exemplary embodiment of the present invention.

A mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Constituent elements shown in FIG. 1 are not essential parts, and the mobile terminal 100 having constituent elements more or less than the constituent elements may be embodied.

Hereinafter, the constituent elements will be described in detail.

The wireless communication unit 110 may include one or more module for enabling wireless communication between the mobile terminal 100 and a wireless communication system or between the mobile terminal 100 and a network at which the mobile terminal 100 is located. The wireless communication unit 110 may include, for example, a broadcasting receiving module 111, a mobile communication module 112, a wireless Internet module 113, a short range communication module 114, and a position information module 115.

The broadcasting receiving module 111 receives a broadcasting signal and/or broadcasting related information from an external broadcasting managing server through a broadcasting channel.

The broadcasting channel may include a satellite channel and a terrestrial channel. The broadcasting management server may be a server that generates and transmits broadcasting signals and/or broadcasting related information or a server that receives previously generated broadcasting signals and/or broadcasting related information and transmits the broadcasting signals and/or broadcasting related information to a terminal. The broadcasting signals may include not only television broadcasting signals, radio broadcasting signals, and data broadcasting signals but also broadcasting signals in which data broadcasting signals are coupled to television broadcasting signals and radio broadcasting signals.

The broadcasting related information may be information on a broadcasting channel, a broadcasting program, or a broadcasting service provider. The broadcasting related information can be provided even through a mobile communication network. In this case, the broadcasting related information can be received by the mobile communication module 112.

The broadcasting related information may exist in various forms. For example, the broadcasting related information may exist in a form of an electronic program guide (EPG) of digital multimedia broadcasting (DMB) or in a form of an electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T) systems. The broadcasting receiving module 111 may be constructed to be suited to other broadcasting systems for providing broadcasting signals as well as the above-described digital broadcasting systems.

The broadcasting signals and/or broadcasting related information received through the broadcasting receiving module 111 are stored in the memory 160.

The mobile communication module 112 transmits/receives a wireless signal to/from at least one of a base station, an external terminal, and a server on a mobile communication network. The wireless signal includes an audio dedicated call signal, an audiovisual communication call signal, or data of various forms according to transmission and reception of text/multimedia messages.

The wireless Internet module 113 is a module for connecting to wireless Internet and may be provided within the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The short range communication module 114 is a module for short range communication. Bluetooth, radio frequency identification (RFID), infrared data association (IrDA), ultra wideband (UWB), and ZigBee can be used as a short range communication technique.

The position information module 115 may identify or obtain a location of the mobile terminal 100. The position information module 115 obtains position information using global navigation satellite system (GNSS). Here, GNSS is a term using for explaining a wireless navigation satellite system for revolving the earth and sending reference signals in which predetermined types of wireless navigation receivers can determine positions thereof of a ground surface or near a ground surface. The GNSS may include a Global Position System (GPS) operating in U.S.A, Galileo operating in Europe, a Global Orbiting Navigational Satellite System (GLONASS) operating in Russia, COMPASS operating in China, and a Quasi-Zenith Satellite System (QZSS) operating in Japan.

The position information module 115 may be a GPS module, which is a typical module of GNSS. The GPS module calculates information about a distance in which one point is separated from three or more satellites and information about a time in which the distance information is measured and then applies a trigonometry to the calculated distance information, thereby calculating three-dimensional position information according to a latitude, a longitude, and an altitude of one point at one time. Further, the GPS module uses a method of calculating position and time information using three satellites and modifying an error of the calculated position and time information using another satellite. The GPS module continuously calculates a present position in real time and calculates speed information using the calculated present position.

Referring to FIG. 1, the A/V input unit 120 is used for inputting an audio signal or a video signal to the mobile terminal 100. The A/V input unit 120 may include a camera 121 and a microphone 122. The camera 121 processes image frames of still pictures or moving pictures obtained by an image sensor in an audiovisual communication mode or a photographing mode. The processed image frames may be displayed in the display module 151.

The image frames processed by the camera 121 may be stored in the memory 160 or transmitted to an external device through the wireless communication unit 110. The mobile terminal 100 may have two or more cameras 121 according to a configuration thereof.

The microphone 122 receives an external audio signal in a call mode, a recording mode, or a voice recognition mode and processes the received audio signal into electric audio data. The processed audio data can be converted into a form that can be transmitted to a mobile communication base station through the mobile communication module 112 and can be output in the call mode. The microphone 122 may use various noise removal algorithms for removing noise generating when an external audio signal is received.

The user input unit 130 enables a user to input data for controlling operation of the mobile terminal 100. The user input unit 130 may include a keypad, a dome switch, a touchpad (e.g., static pressure/capacitance), a jog wheel, and a jog switch.

The sensing unit 140 generates a sensing signal for controlling operation of the mobile terminal 100 by detecting a present state of the mobile terminal 100, such as an open/close state of the mobile terminal 100, a position of the mobile terminal 100, a presence or absence of user contact with the mobile terminal 100, an orientation of the mobile terminal 100, and acceleration/deceleration of the mobile terminal 100. For example, when the mobile terminal 100 is a slide mobile terminal, the sensing unit 140 may sense whether a sliding portion of the mobile terminal 100 is open or closed. The sensing unit 140 may also sense presence or absence of power provided by the power supply unit 190, presence or absence of a coupling between the interface unit 170 and an external device, etc. The sensing unit 140 may include a proximity sensor 141.

The output unit 150 may generate an output relevant to a sight sense, an auditory sense, a tactile sense and/or the like. The output unit 150 may include a display module 151, an audio output module 152, an alarm unit 153, a haptic module 154 and/or the like.

The display module 151 displays (outputs) information processed by the mobile terminal 100. For example, when the mobile terminal 100 is in a call mode, the display module 151 may display a user interface (UI) or a graphic user interface (GUI) associated with the call. When the mobile terminal 100 is in an audiovisual communication mode or a photographing mode, the display module 151 may display a photographed and/or received picture, a UI, or a GUI.

The display module 151 may be one of a liquid crystal display (LCD), a thin film transistor liquid crystal display (TFT LCD), an organic light-emitting diode (OLED), a flexible display, and a three-dimensional display.

The display module 151 may have a transparent or light-transmissive type configuration to enable an external environment to see therethrough. This may be called a transparent display. A typical transparent display may include a transparent LCD. A rear structure of the display module 151 may also have a light-transmissive type configuration. In this configuration, a user can see an object located behind the terminal body through an area occupied by the display module 151 of the terminal body.

Two or more display units 151 may be provided according to a form of the mobile terminal 100. For example, a plurality of displays may be provided in a single face of the mobile terminal 100 to be integrally formed or spaced apart from the single face. Alternatively, each of a plurality of displays may be provided in different faces of the mobile terminal 100.

When the display module 151 and a sensor for detecting a touch action (hereafter, a touch sensor) are formed in an interlayer structure (hereafter, a touch screen), the display module 151 may be used as an input device as well as an output device. For example, the touch sensor may include a touch film, a touch sheet, a touchpad and/or the like.

The touch sensor may convert a variation of a pressure applied to a specific portion of the display module 151 or capacitance generated from a specific portion of the display module 151 to an electric input signal. The touch sensor may detect a pressure of a touch as well as a position and size of the touch.

When a touch input is provided to the touch sensor, signal(s) corresponding to the touch input may be transferred to a touch controller. The touch controller may process the signal(s) and then transfer corresponding data to the controller 180. The controller 180 may therefore know which portion of the display module 151 is touched.

Referring to FIG. 1, the proximity sensor 141 can be provided within the mobile terminal 100 enclosed by the touch screen or around the touch screen. The proximity sensor 141 may detect presence or absence of an object approaching a predetermined detecting surface or an object existing around the proximity sensor 141 using intensity of an electromagnetic field or infrared rays without a mechanical contact. The proximity sensor 141 may have a longer lifetime than that of a contact type sensor and may also have a greater usage than that of a contact type sensor.

The proximity sensor 141 may be one of a transmissive photoelectric sensor, a direct reflective photoelectric sensor, a mirror reflective photoelectric sensor, a high frequency oscillation proximity sensor, a capacitance proximity sensor, a magnetic proximity sensor, an infrared proximity sensor and/or the like.

When the touch screen is an electrostatic type, the proximity sensor 141 may detect proximity of a pointer using a variation of an electric field according to the proximity of the pointer. In this case, the touch screen (touch sensor) may be classified as the proximity sensor.

Hereinafter, for convenience of description, an action in which a pointer approaches the touch screen without contacting with the touch screen may be called a proximity touch. An action in which a pointer actually touches the touch screen may be called a contact touch. A location of the touch screen proximity-touched by the pointer may be a position of the pointer vertically corresponding to the touch screen when the pointer performs the proximity touch.

The proximity sensor 141 may detect a proximity touch and a proximity touch pattern (e.g., a proximity touch distance, a proximity touch direction, a proximity touch speed, a proximity touch duration, a proximity touch position, a proximity touch shift state, etc.). Information corresponding to the detected proximity touch action and the detected proximity touch pattern may be output on the touch screen.

The audio output module 152 may output audio data received from the wireless communication unit 110 in a call signal reception mode, a call mode or a recording mode, a voice recognition mode, a broadcasting receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like. Further, the audio output module 152 may output sound through an earphone jack 116. The user can hear sound output by connecting an earphone to the earphone jack 116.

The alarm unit 153 may output a signal for announcing an event occurrence of the mobile terminal 100. An event occurring in the mobile terminal 100 may include a call signal reception, a message reception, a key signal input, a touch input and/or the like. The alarm unit 153 may output a signal for announcing an event occurrence by way of vibration or the like as well as a video signal or an audio signal. The video signal may be output through the display module 151. The audio signal may be output through the audio output module 152.

The haptic module 154 may generate various haptic effects that can be sensed by a user. A vibration is a typical example of haptic effects to be generated by the haptic module 154. Intensity and pattern of a vibration generated from the haptic module 154 can be controlled. For example, the haptic module 154 may synthesize and output or may sequentially output different vibrations.

The haptic module 154 may generate various haptic effects including a vibration, an effect caused by such a stimulus as a pin array vertically moving to a contact skin surface, a jet force of air via an outlet, a suction force of air via an inlet, a skim on a skin surface, a contact of an electrode, an electrostatic force and the like, and an effect by hot/cold sense reproduction using an endothermic or exothermic device.

The haptic module 154 may provide the haptic effect through a direct contact. The haptic module 154 may enable a user to experience the haptic effect through muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of a vibration and sound of various patterns outputted when a touch is input to the touch screen.

The memory 160 may be one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and/or the like. The mobile terminal 100 may operate in association with a web storage that performs a storage function of the memory 160 in the Internet.

The interface unit 170 may play a role as a passage for external devices connected to the mobile terminal 100. The interface unit 170 may receive data from an external device. The interface unit 170 may receive power and then the power may be delivered to elements within the mobile terminal 100. The interface unit 170 may enable data within the mobile terminal 100 to be transferred to an external device. The interface unit 170 may include a wired/wireless headset port, an external charger port, a wired/wireless data port, a memory card port, a port for connecting to a device having an identity module, an audio input/output (I/O) port, a video input/output (I/O) port, an earphone port and/or the like.

The identity module may be a chip that stores various kinds of information for authenticating use of the mobile terminal 100. The identify module may be one of a user identity module (UIM), a subscriber identity module (SIM), a universal subscriber identity module (USIM) and/or the like. A device provided with the above identity module (hereafter, an identity device) may be manufactured in the form of a smart card. The identity device may be connected to the mobile terminal 100 via the port.

When the mobile terminal 100 is connected to a cradle, the interface unit 170 may play a role as a passage for supplying power from a cradle to the mobile terminal 100, or may play a role as a passage for delivering various instruction signals, which are input from the cradle by a user, to the mobile terminal 100. Various instruction signals input from the cradle or the power may operate as a signal for recognizing that the mobile terminal 100 is accurately mounted in the cradle.

The controller 180 controls overall operations of the mobile terminal 100. For example, the controller 180 may perform control and processing relevant to audio dedicated communication, data communication, audiovisual communication and/or the like. The controller 180 may have a multimedia module 181 for multimedia reproduction. The multimedia module 181 may be implemented within the controller 180 or may be configured separate from the controller 180.

The controller 180 may perform a pattern recognizing processing for recognizing a handwriting input performed on the touch screen as a character or recognizing a picture drawing input performed on the touch screen as an image.

The power supply unit 190 may receive an external or internal power and then supply the power required for operations of the respective elements by the control of the controller 180.

Various exemplary embodiments described in the present invention may be implemented within a recording medium that can be read by a computer or a computer-like device using software, hardware, or a combination thereof.

According to a hardware implementation, exemplary embodiments described in the present invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, exemplary embodiments may be implemented by the controller 180.

For a software implementation, exemplary embodiments described herein may be implemented with separate software modules, such as procedures and functions, each of which may perform one or more of the functions and operations described herein. Software codes may be implemented with a software application written in any appropriate programming language and may be stored in the memory 160, and may be executed by the controller 180.

Figure 2:
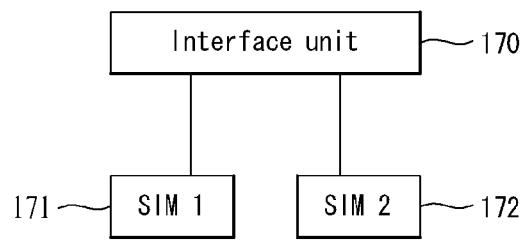
FIG. 2 is a diagram illustrating a conception of mounting a SIM in the mobile terminal according to an exemplary embodiment of the present invention.

FIG. 2 is a diagram illustrating a conception of mounting a user identity module in the mobile terminal according to an exemplary embodiment of the present invention.

As described above, various identity modules such as a user identify module (UIM), a subscriber identify module (SIM), and a universal subscriber identity module (USIM) may be included in or connected to the interface portion 170.

In this document, various identity modules such as the UIM, the SIM, and the USIM are referred to as an 'SIM'.

Further, in this document, the mobile terminal 100 includes a plurality of SIMs, and for convenience of description, as shown in FIG. 2, it is assumed that the mobile terminal 100 includes a first SIM 171 and a second SIM 172. However, the number of the SIM is not to limited to two.

Hereinafter, exemplary embodiments of the present invention will be described. In the present invention, for convenience of description, it is assumed that the display module 151 is a touch screen 151. As described above, the touch screen 151 can perform both an information display function and an information input function. However, the present invention is not limited thereto. Further, a touch described in this document includes both a contact touch and a proximity touch.

Figure 3:
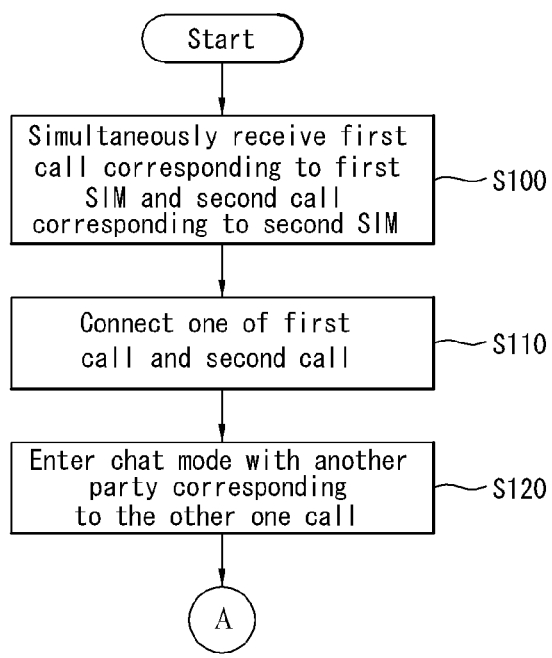
FIG. 3 is a flowchart illustrating a method of controlling a mobile terminal according to a first exemplary embodiment of the present invention.

FIG. 3 is a flowchart illustrating a method of controlling a mobile terminal according to a first exemplary embodiment of the present invention. FIGS. 4 to 15 are screen examples illustrating a method of controlling a mobile terminal according to a first exemplary embodiment of the present invention.

The method of controlling a mobile terminal according to a first exemplary embodiment of the present invention can be embodied in the mobile terminal 100 described with reference to FIG. 1. Hereinafter, a method of controlling a mobile terminal according to the first exemplary embodiment of the present invention and operation of the mobile terminal 100 for embodying the method will be described in detail with reference to necessary drawings.

Referring to FIG. 3, the controller 180 simultaneously receives a first call corresponding to the first SIM 171 and a second call corresponding to the second SIM 172 (S100).

The first call corresponding to the first SIM 171 is a call in which another party transmits to the mobile terminal 100 using a phone number corresponding to the first SIM 171.

The second call corresponding to the second SIM 172 is a call in which another party transmits to the mobile terminal 100 using a phone number corresponding to the second SIM 172.

Simultaneous reception of the first call and the second call indicates reception of the first call and the second call at a specific time point. That is, it is not always necessary that a start time point of reception of the first call coincides with a start time point of reception of the second call.

In other words, simultaneous reception of the first call and the second call indicates a state of receiving the first call through the first SIM 171 and the second call through the second SIM 172 in a state where a user does take no operation (connection or rejection) for the first SIM 171 and the second call.

Figure 4:
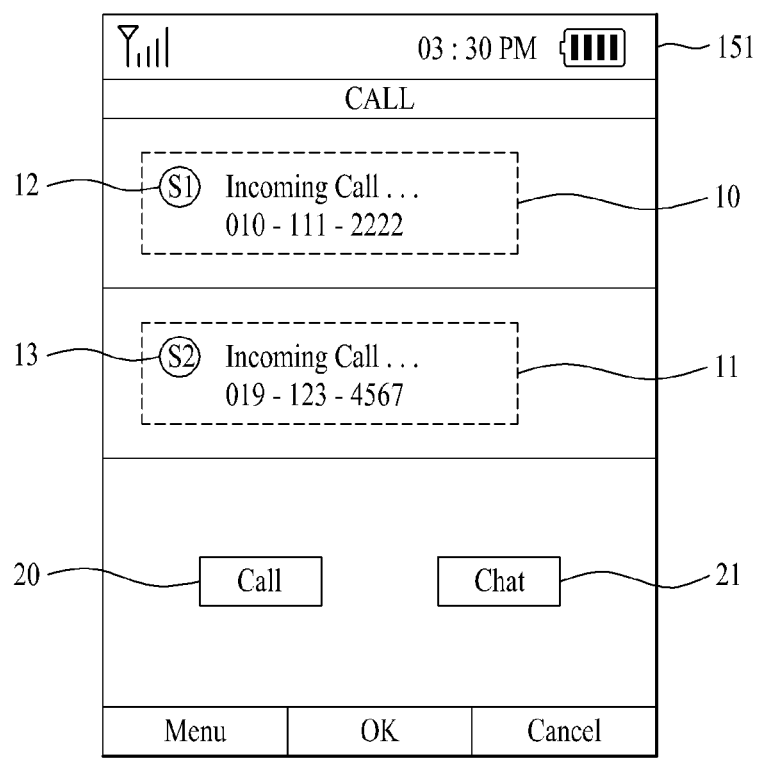
FIGS. 4 to 15 are screen examples illustrating a method of controlling a mobile terminal according to a first exemplary embodiment of the present invention.

FIG. 4 illustrates an example of a screen in which the first call and the second call are simultaneously received.

For example, referring to FIG. 4, icons 12 and 13 corresponding to the first SIM 171 and the second SIM 172, respectively, a first call reception indicator 10 corresponding to the first call and a second call reception indicator 11 corresponding to the second call may be displayed on the touch screen 151.

When the first and second calls are simultaneously received, the controller 180 connects one of the first call and the second call (S110), and the controller 180 controls to enter a chat mode with another party corresponding to the other one call (S120).

Hereinafter, various exemplary embodiments in which steps S110 and S120 are performed will be described.

As shown in FIG. 4, when the first call and the second call are simultaneously received, the controller 180 controls to display a call icon 20 for connecting a call and a chat icon 21 for entering a chat mode on the touch screen 151.

Hereinafter, a case where a user performs audio dedicated communication (or audiovisual communication) with another party who sends the first call by connecting the first call and has a chatting with another party who sends the second call will be described.

Figure 5:
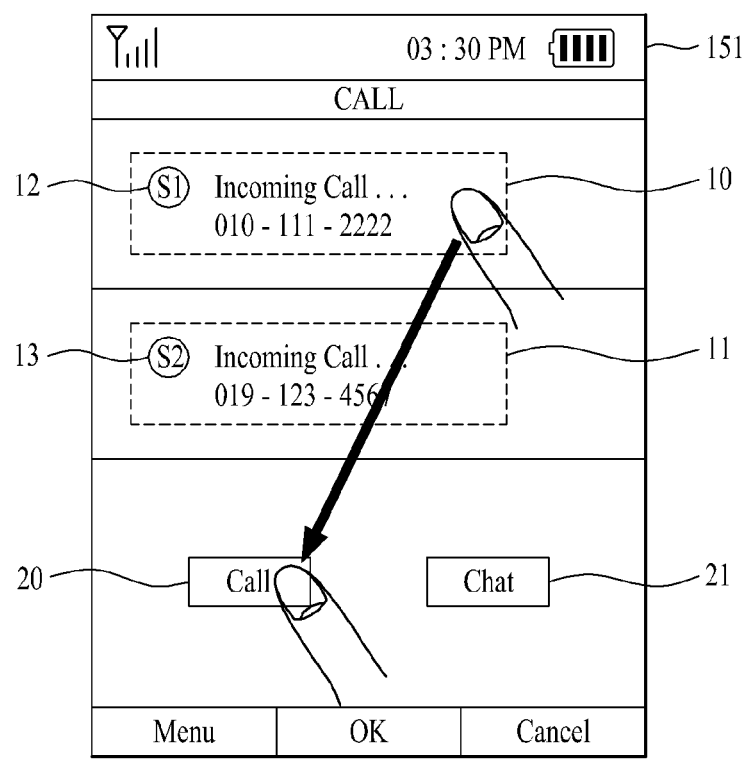
Figure 9:
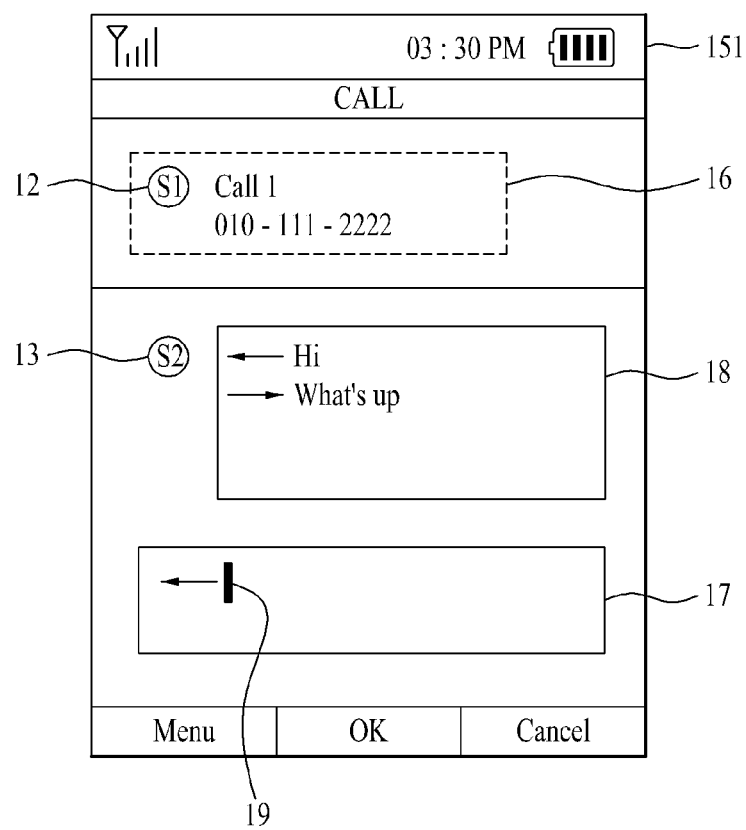

For example, as shown in FIG. 5, when the user touches the first call reception indicator 10 and drags to the call icon 20, the controller 180 controls to display a first call connection indicator 16 on the touch screen 151 by connecting the first call and to enter a chat mode that has a chatting with another party corresponding to the second call, as shown in FIG. 9. A detailed description of a chat mode shown in FIG. 9 will be described later.

Figure 6:
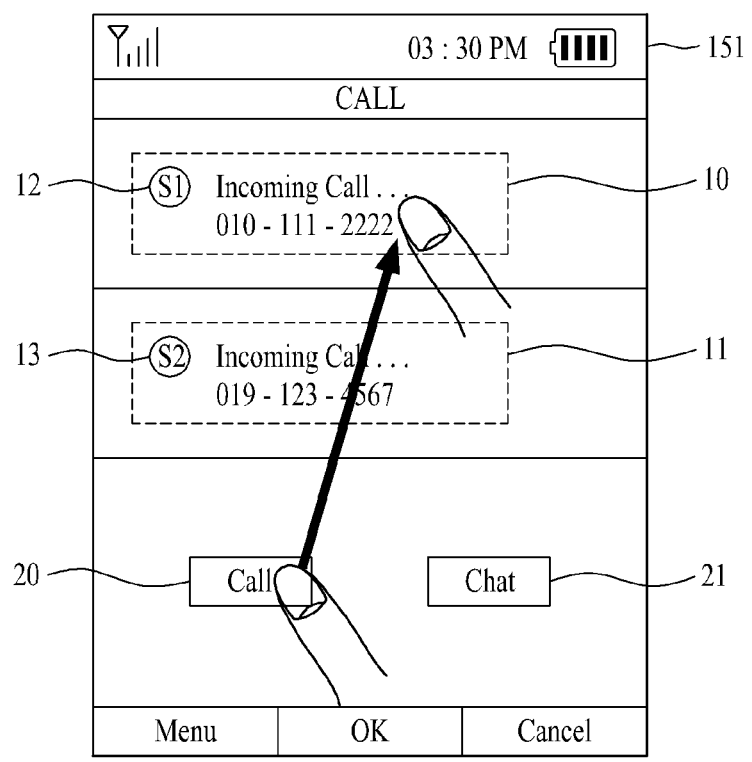

Further, for example, as shown in FIG. 6, when the user touches the call icon 20 and drags to the first call reception indicator 10, the controller 180 controls to connect the first call and to enter a chat mode with another party corresponding to the second call, as shown in FIG. 9.

Figure 7:
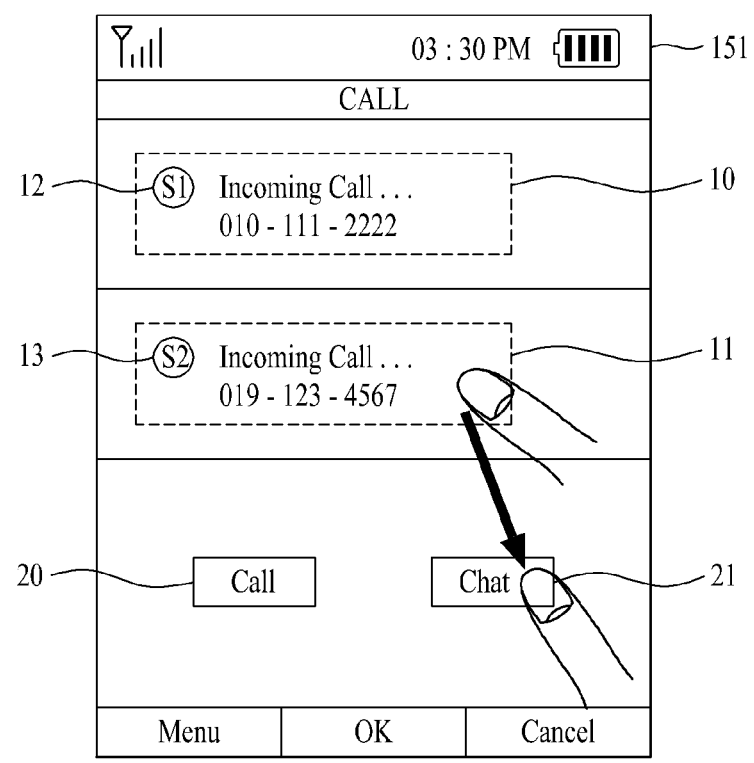

Further, for example, as shown in FIG. 7, when the user touches the second call reception indicator 11 and drags to the chat icon 21, the controller 180 controls to connect the first call and to enter a chat mode with another party corresponding to the second call, as shown in FIG. 9.

Figure 8:
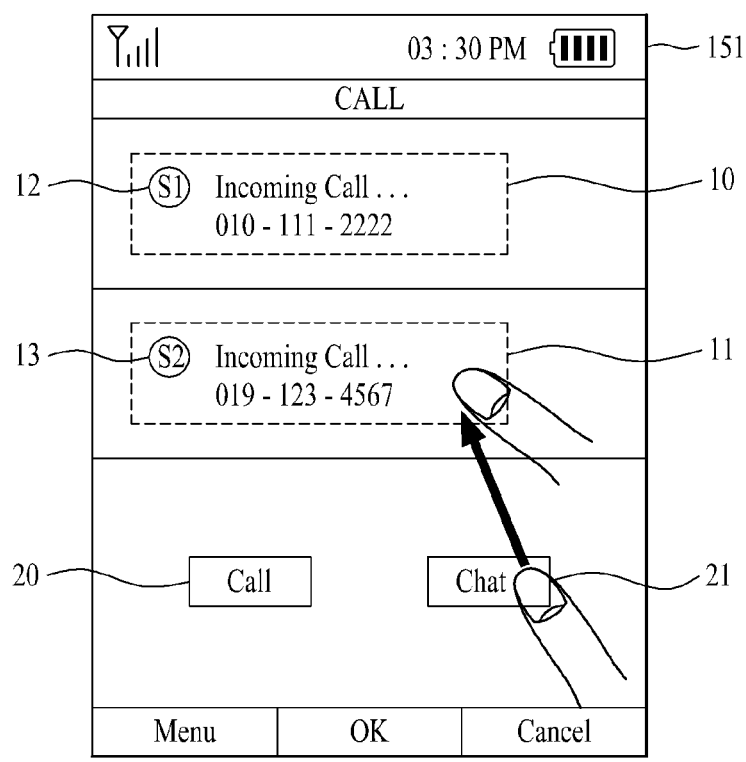

Further, for example, as shown in FIG. 8, when the user touches the chat icon 21 and drags to the second call reception indicator 11, the controller 180 controls to connect the first call and to enter a chat mode with another party corresponding to the second call, as shown in FIG. 9.

With the above-described various methods, the controller 180 controls to connect the first call and to enter a chat mode with another party corresponding to the second call.

Here, in order to have a chatting with another party who sends the second call, the controller 180 acquires an instant messaging (IM) address or identification (ID) of another party who sends the second call.

The IM address or ID corresponding to another party who sends the second call is stored in the memory 160.

When an attempt of chatting with another party who sends the second call using the IM address or ID is succeeded, the controller 180 controls to display an information input window 17 and an information display window 18 on the touch screen 151, as shown in FIG. 9.

Information that is input by the user through the information input window 17 and information that is input by another party can be displayed through the information display window 18.

The controller 180 may provide a soft keyboard on the touch screen 151 so that the user can input information through the information input window 17.

In order to display that the information input window 17 is activated or that information input is in a standby state, the controller 180 controls to display a cursor 19 on the information input window 17.

Figure 10:
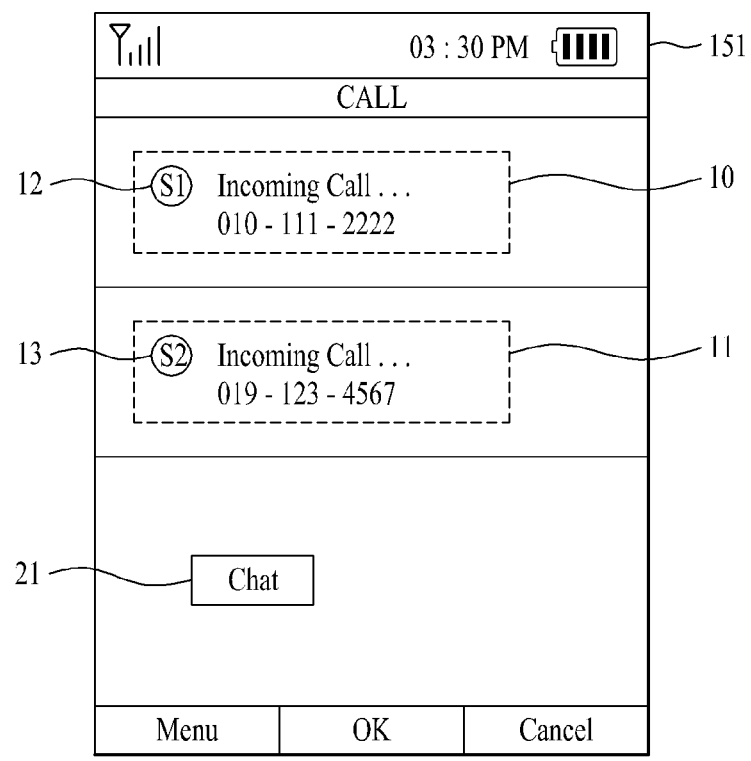

As shown in FIG. 10, when the first call and the second call are simultaneously received, the controller 180 controls to display the first call reception indicator 10, the second call reception indicator 11, and the chat icon 21 on the touch screen 151.

That is, the screen shown in FIG. 10 does not include a call icon 20 unlike the screen of FIG. 4.

Figure 11:
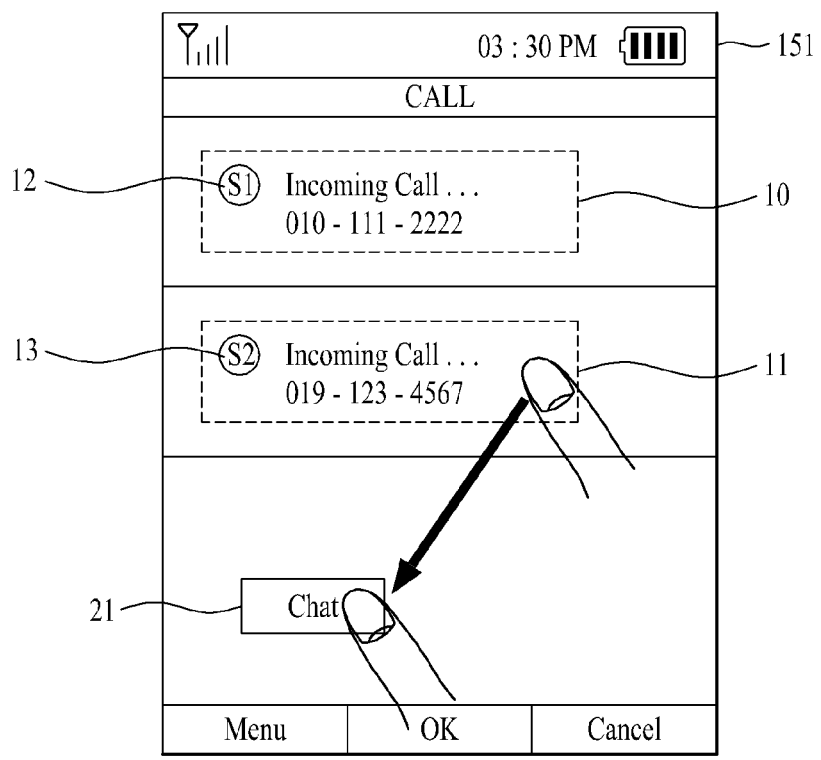

For example, as shown in FIG. 11, when the user touches the second call reception indicator 11 and drags to the chat icon 21, the controller 180 controls to connect the first call and to enter a chat mode with another party corresponding to the second call, as shown in FIG. 9.

Figure 12:
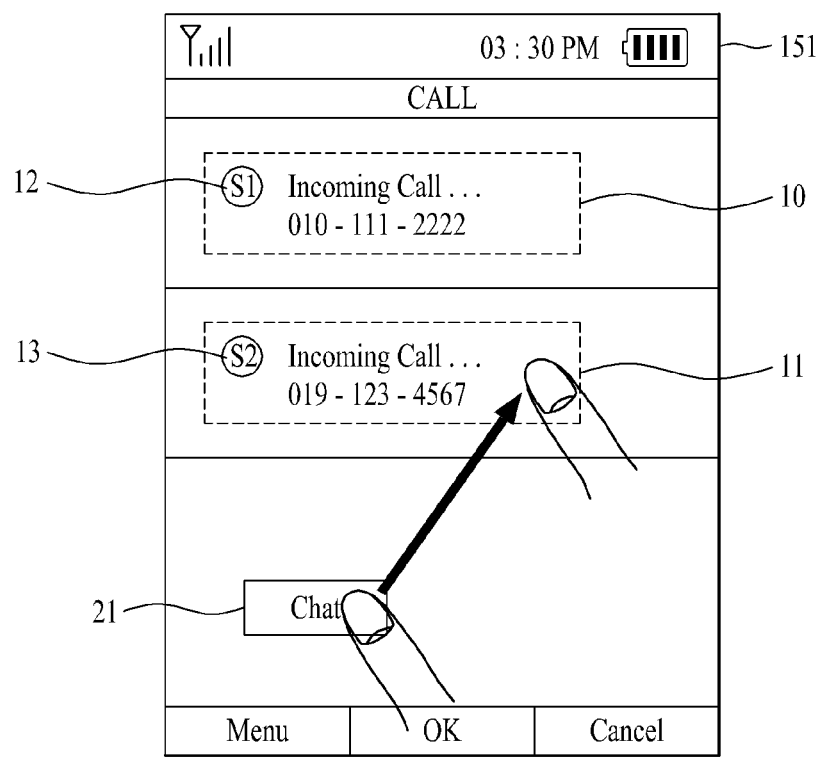

Further, for example, as shown in FIG. 12, when the user touches the chat icon 21 and drags to the second call reception indicator 11, the controller 180 controls to connect the first call and to enter a chat mode with another party corresponding to the second call, as shown in FIG. 9.

Figure 13:
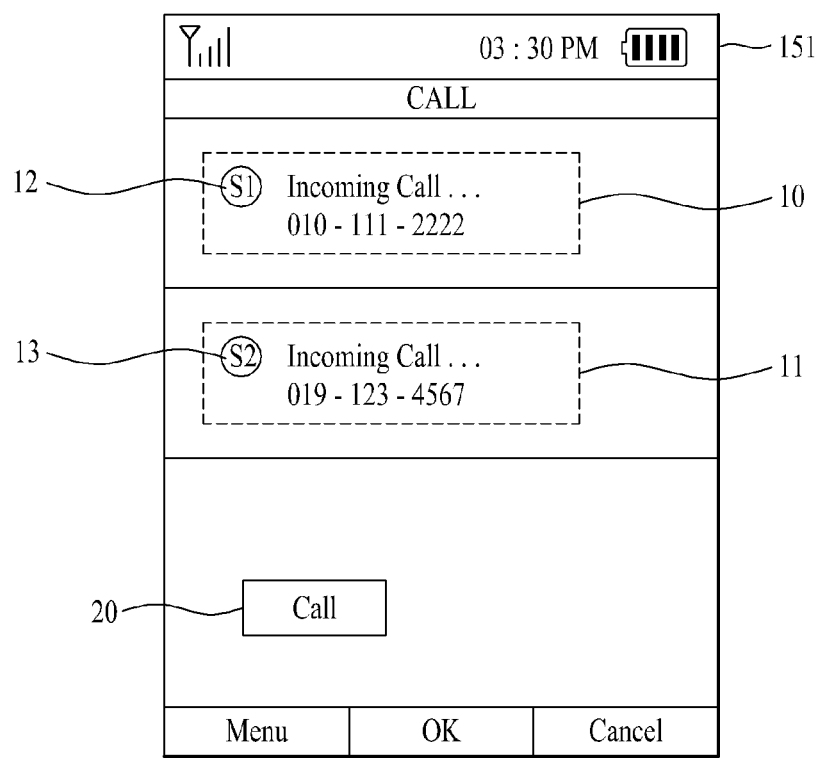

As shown in FIG. 13, when the first call and the second call are simultaneously received, the controller 180 controls to display the first call reception indicator 10, the second call reception indicator 11, and the call icon 20 on the touch screen 151.

That is, the screen shown in FIG. 13 does not include a chat icon 21 unlike the screen of FIG. 4.

Similar to the above-described method, in FIG. 13, when the user touches the first call reception indicator 10 and drags and drops to the call icon 20, or when the user touches the call icon 20 and drags and drops to the first call reception indicator 10, the controller 180 controls to connect the first call and to enter a chat mode with another party corresponding to the second call.

As described above, in order to enter a chat mode for having a chatting with one of another party who sends the first call and another party who sends the second call, the controller 180 should acquire an IM address or ID of another party, which is a chatting target.

In order to notify a user of the mobile terminal 100 of another party that can have a chatting, the controller 180 can provide an icon representing a chatting possibility on the touch screen 151.

Figure 14:
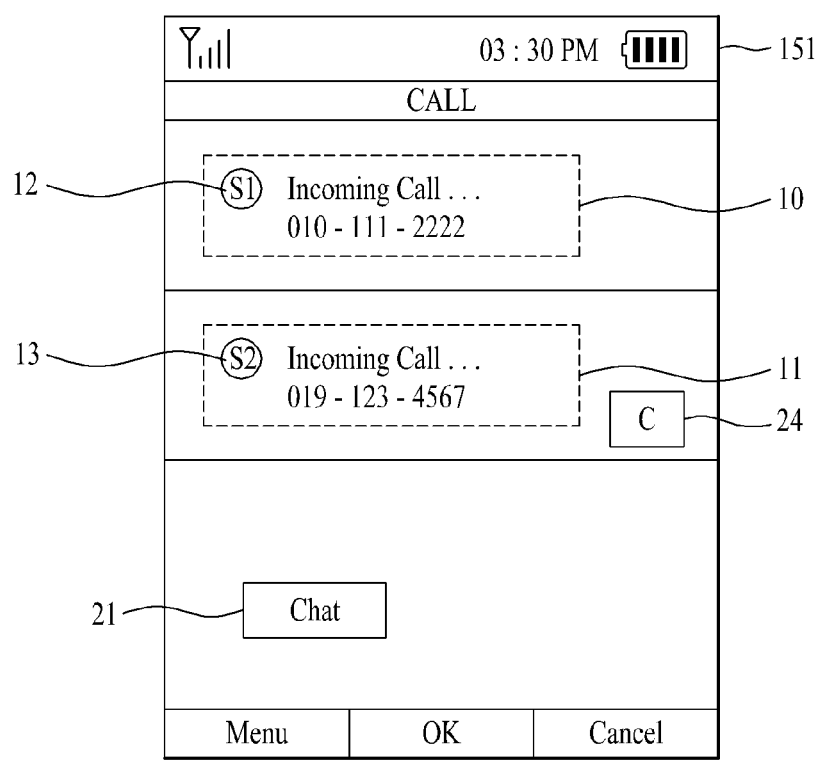
Figure 15:
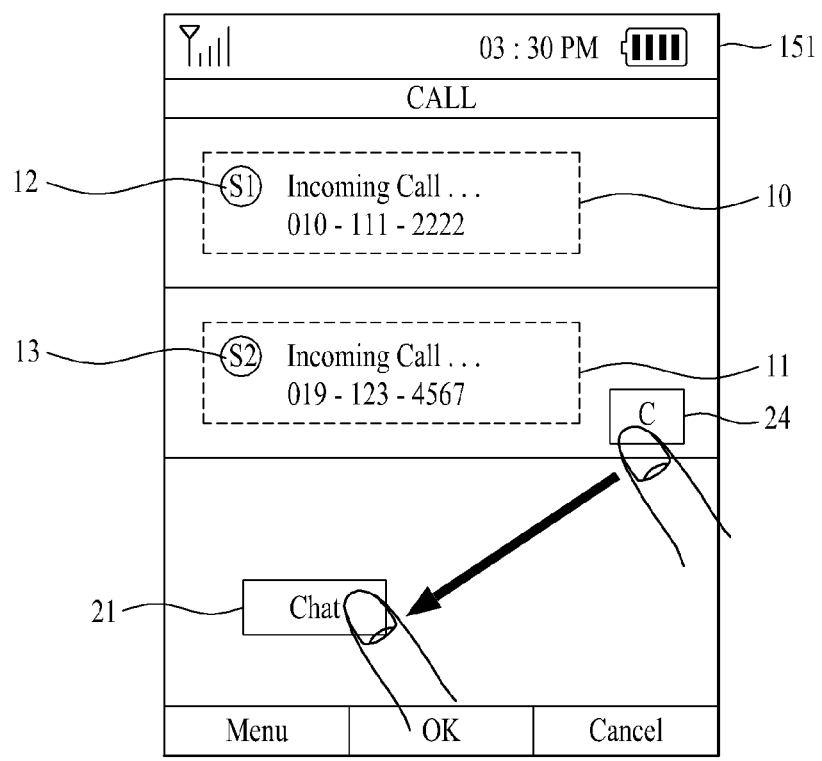

For example, referring to FIG. 14, when it is determined that an IM address or ID corresponding to another party who sends the first call cannot be acquired and when an IM address or ID corresponding to another party who sends the second call is stored in the memory 160, the controller 180 controls to display an icon 24 representing a chatting possibility with another party who sends the second call.

Here, when the user touches the chatting possible display icon 24 and drags and drops the chat icon 21, the controller 180 controls to connect the first call and to enter a chat mode with another party corresponding to the second call, as shown in FIG. 9.

Figure 16:
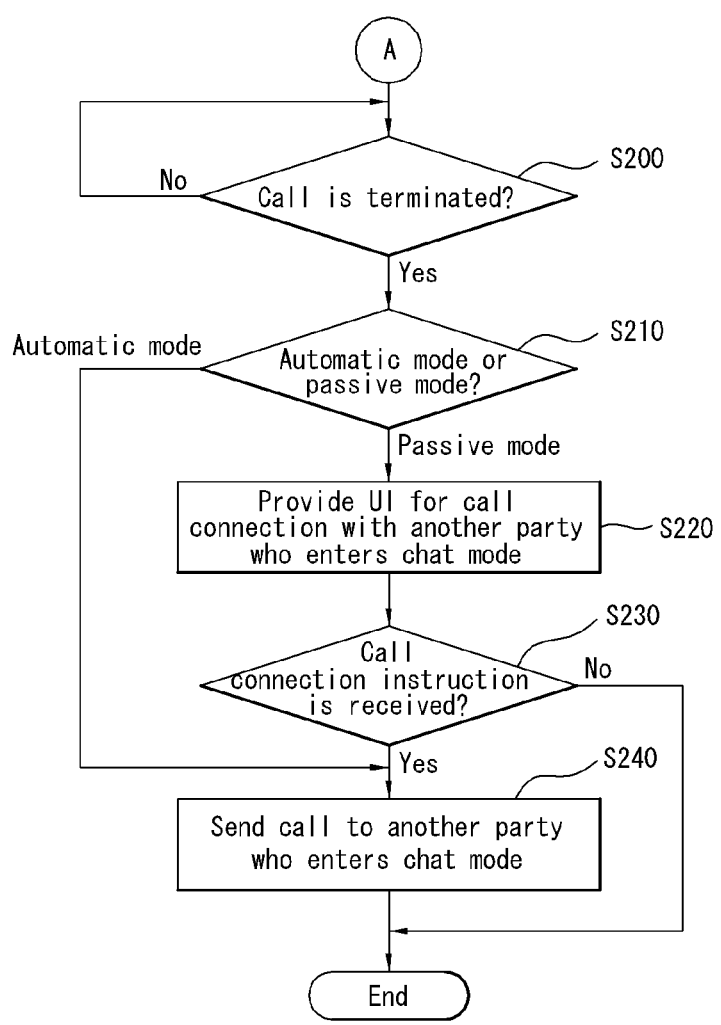
FIG. 16 is a flowchart illustrating a method of controlling a mobile terminal according to a second exemplary embodiment of the present invention.
Figure 17:
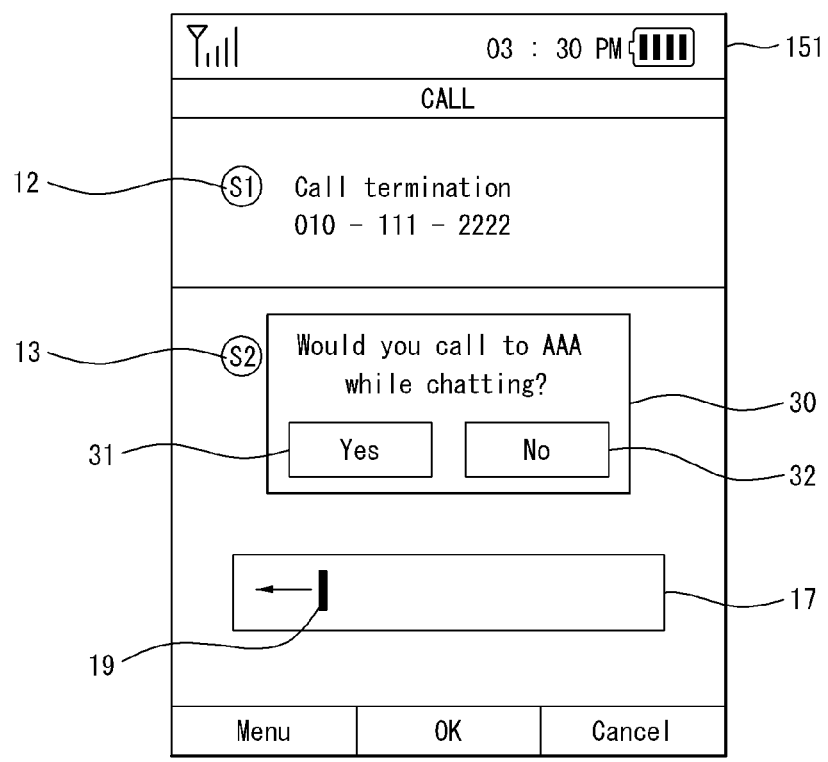
FIGS. 17 to 19 illustrate screen examples illustrating a method of controlling a mobile terminal according to a second exemplary embodiment of the present invention.
Figure 18:
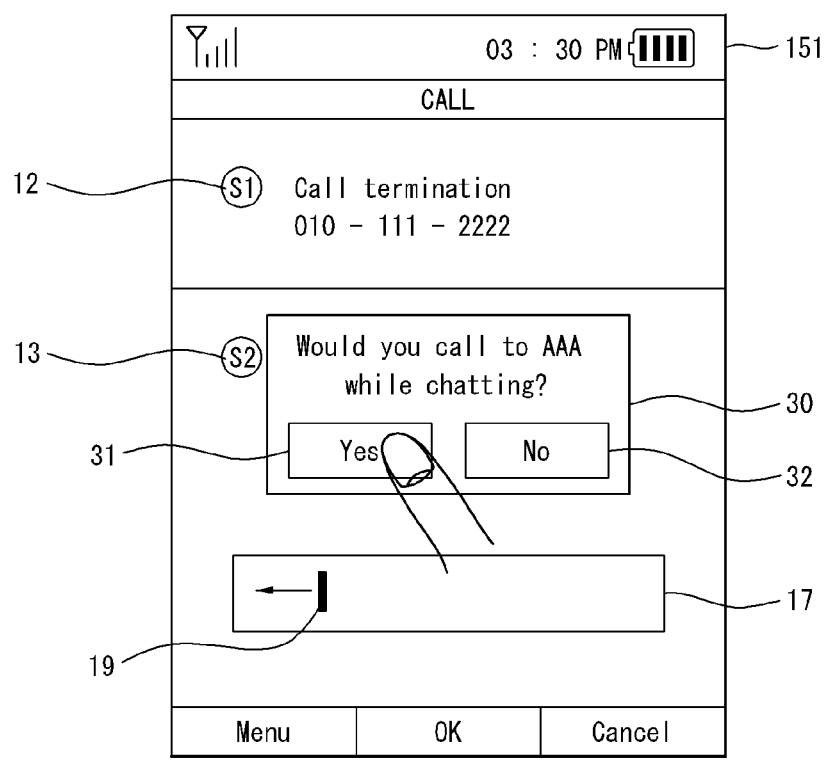
Figure 19:
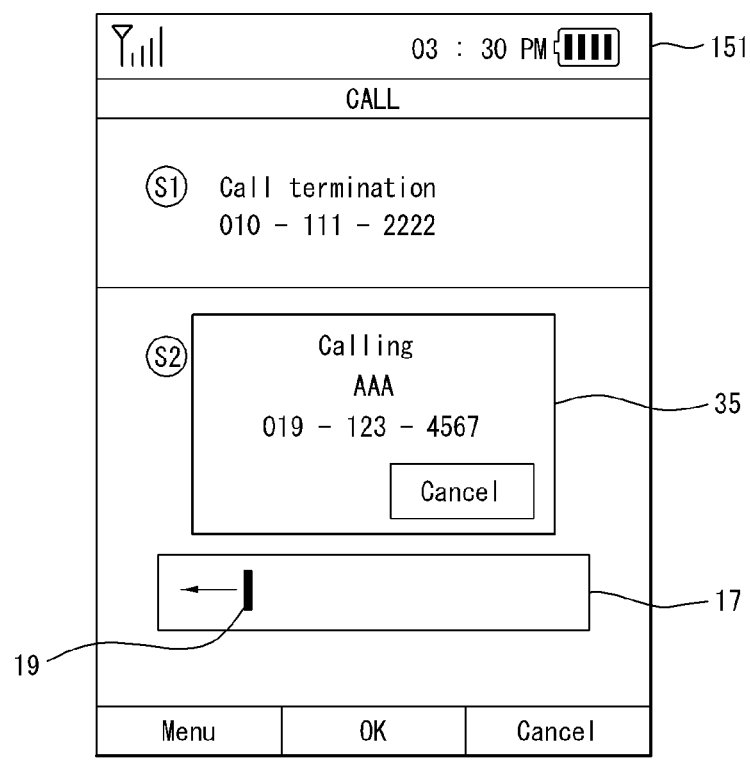

FIG. 16 is a flowchart illustrating a method of controlling a mobile terminal according to a second exemplary embodiment of the present invention. FIGS. 17 to 19 illustrate screen examples illustrating a method of controlling a mobile terminal according to a second exemplary embodiment of the present invention.

The method of controlling a mobile terminal according to a second exemplary embodiment of the present invention can be embodied in the mobile terminal 100 described with reference to FIG. 1. Hereinafter, a method of controlling a mobile terminal according to a second exemplary embodiment of the present invention and operation of the mobile terminal 100 for embodying the method will be described in detail with reference to necessary drawings.

The method of controlling a mobile terminal according to a second exemplary embodiment of the present invention can be performed when the method of controlling a mobile terminal according to the first exemplary embodiment of the present invention is performed.

Referring to FIG. 16, when the first call is connected and a user has a chatting with another party corresponding to the second call, the controller 180 determines whether the connected first call is terminated (S200).

If the connected first call is terminated, the controller 180 determines whether the mobile terminal is set to an automatic mode or a passive mode (S210).

If the mobile terminal is set to a passive mode, the controller 180 provides a user interface (UI) for a call connection with another party corresponding to the second call that enters the chat mode (S220).

FIG. 17 illustrates an example of a user interface for connecting the call.

For example, referring to FIG. 17, the controller 180 provides a user interface 30 for connecting a call with another party AAA for chatting through the touch screen 151.

The controller 180 determines whether a call connection instruction is received through a user interface for connecting the call (S230), and if a call connection instruction is received through a user interface for connecting the call, the controller 180 sends a call to another party who enters the chat mode (S240). If a call connection instruction is not received through a user interface for connecting the call, the process is terminated.

For example, as shown in FIG. 18, when the user touches an icon 31 of accepting transmission of a call to the another party AAA for chatting, the controller 180 provides an information window 35 for notifying the user of a call transmission attempt on the touch screen 151 while trying to transmit a call to the another party AAA for chatting, as shown in FIG. 19.

If the mobile terminal is set to an automatic mode at step S210, the controller 180 automatically sends a call to another party who enters the chat mode (S240).

Figure 20:
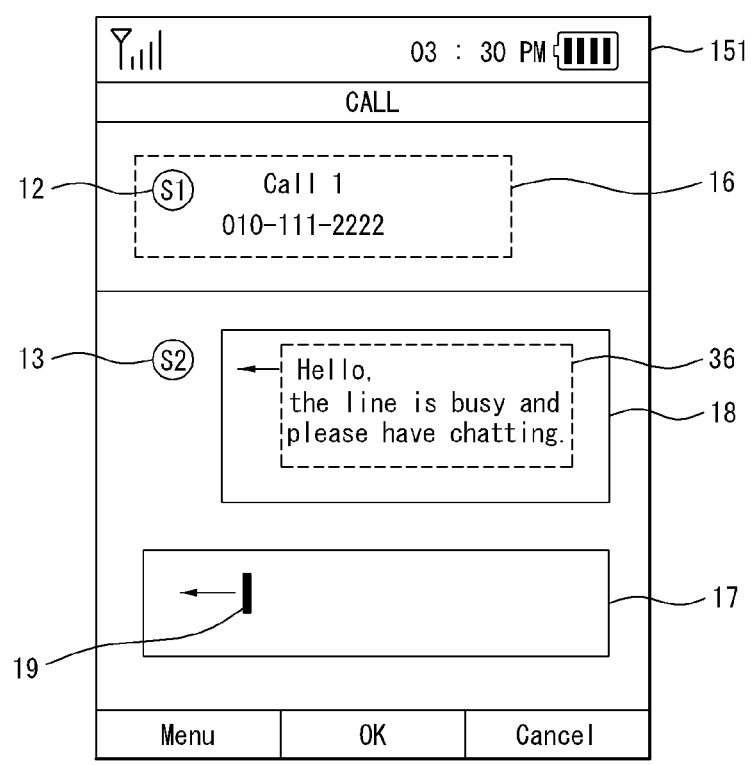
FIG. 20 illustrates a screen example of automatically transmitting a phrase according to an exemplary embodiment of the present invention.

FIG. 20 illustrates a screen example of automatically transmitting a phrase according to an exemplary embodiment of the present invention.

For example, in the foregoing exemplary embodiment, as the controller 180 controls to connect the first call and to enter a chat mode with another party who sends the second call or to try to enter the chat mode, the controller 180 automatically transmits a predetermined phrase 36 to another party who sends the second call.

Figure 21:
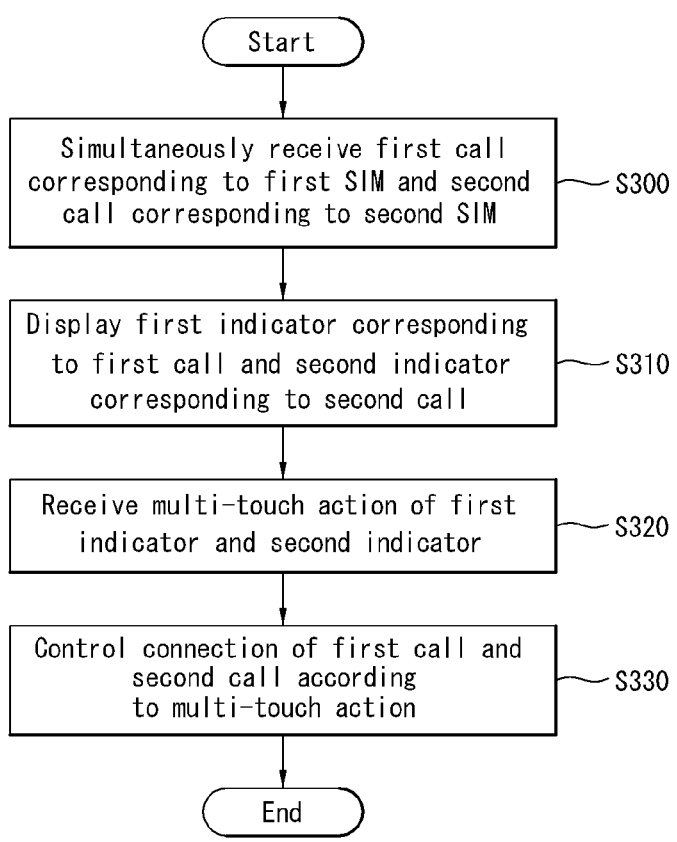
FIG. 21 is a flowchart illustrating a method of controlling a mobile terminal according to a third exemplary embodiment of the present invention.

FIG. 21 is a flowchart illustrating a method of controlling a mobile terminal according to a third exemplary embodiment of the present invention. FIGS. 22 to 29 illustrate screen examples illustrating a method of controlling a mobile terminal according to the third exemplary embodiment of the present invention.

The method of controlling a mobile terminal according to the third exemplary embodiment of the present invention can be embodied in the mobile terminal 100 described with reference to FIG. 1. Hereinafter, a method of controlling a mobile terminal according to a third exemplary embodiment of the present invention and operation of the mobile terminal 100 for embodying the method will be described in detail with reference to necessary drawings.

Referring to FIG. 21, the controller 180 simultaneously receives the first call corresponding to the first SIM 171 and the second call corresponding to the second SIM 172 (S300). Step S300 corresponds to step S100 of the first exemplary embodiment according to the present invention.

As the first call and the second call are simultaneously received, the controller 180 controls to display a first indicator corresponding to the first call and a second indicator corresponding to the second call on the touch screen 151 (S310).

Figure 22:
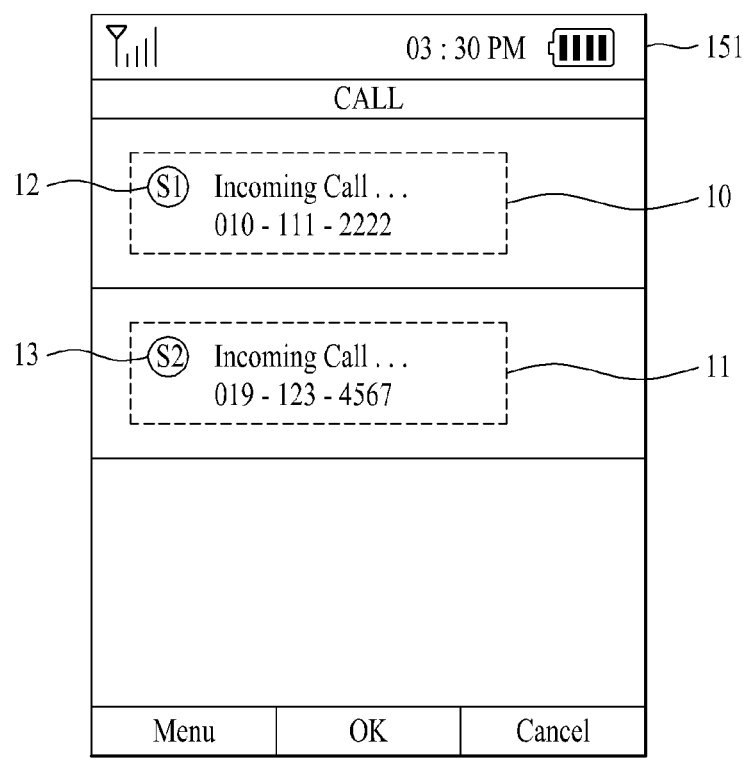
FIGS. 22 to 29 illustrate screen examples illustrating a method of controlling a mobile terminal according to a third exemplary embodiment of the present invention.

For example, referring to FIG. 22, as described above, the controller 180 displays a first call reception indicator 10 and a second call reception indicator 11 on the touch screen 151.

The controller 180 receives a multi-touch action to the first indicator and the second indicator (S320) and controls a connection of the first call and the second call according to the multi-touch action (S330).

Hereinafter, various exemplary embodiments of steps S320 and S330 will be described with reference to the drawings.

Figure 23:
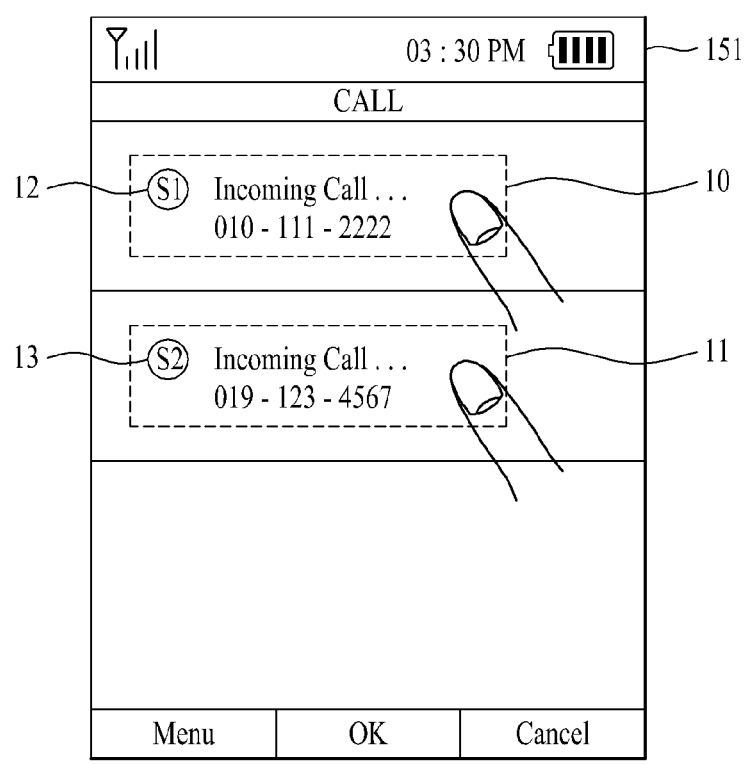

For example, referring to FIG. 23, the user can input a first multi-touch action of simultaneously touching one time the first call reception indicator 10 and the second call reception indicator 11.

Figure 24:
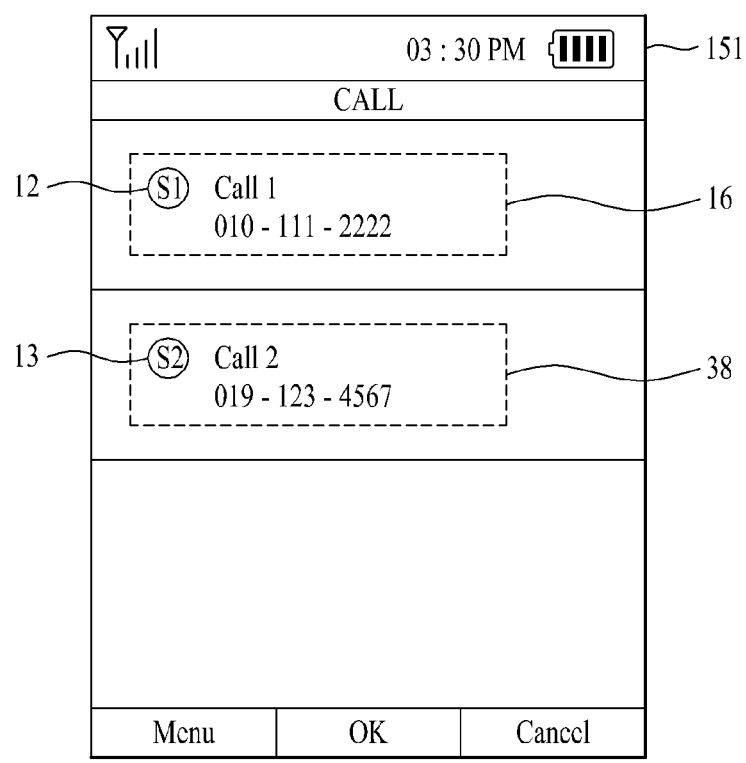

The controller 180 connects both the first call and the second call according to the first multi-touch action to the first and second call reception indicators 10 of the user, as shown in FIG. 24.

As the first call and the second call are connected, the controller 180 controls to display a first call connection indicator 16 corresponding to the first call and a second call connection indicator 38 corresponding to the second call on the touch screen 151, as shown in FIG. 24.

Figure 25:
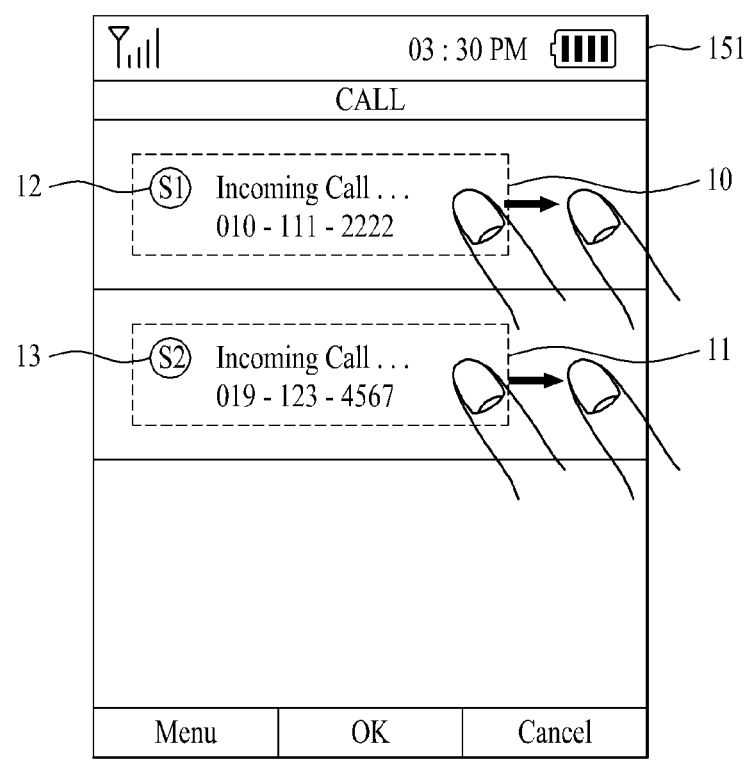

Further, for example, referring to FIG. 25, the user can input a second multi-touch action including a drag (flicking) action of each of the first call reception indicator 10 and the second call reception indicator 11.

The controller 180 rejects both connections to the first call and the second call according to the second multi-touch action to the first and second call reception indicators 10 of the user.

Figure 26:
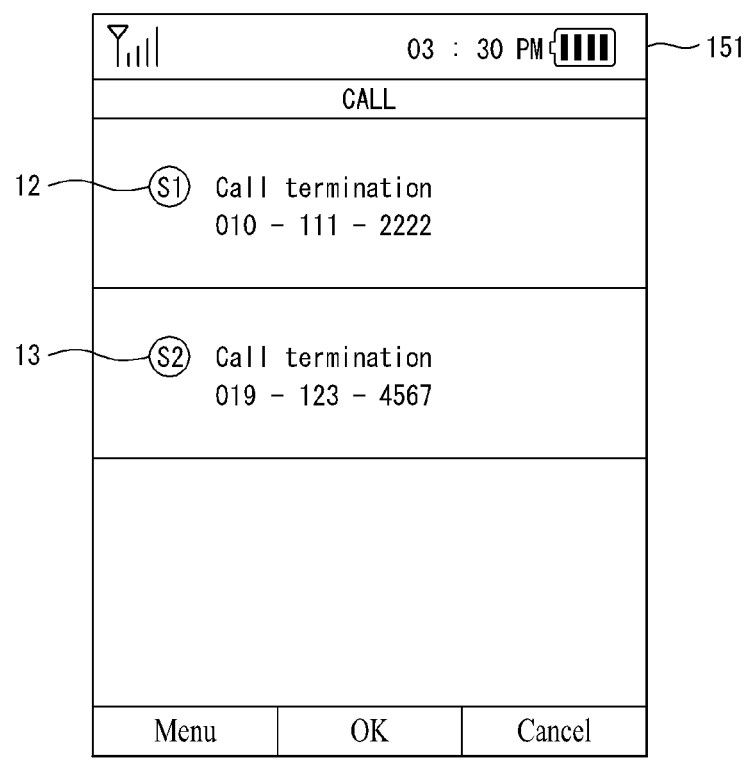

As both connections to the first call operation and the second call are rejected, the controller 180 controls to display information (or an indicator) representing call termination on the touch screen 151, as shown in FIG. 26.

Figure 27:
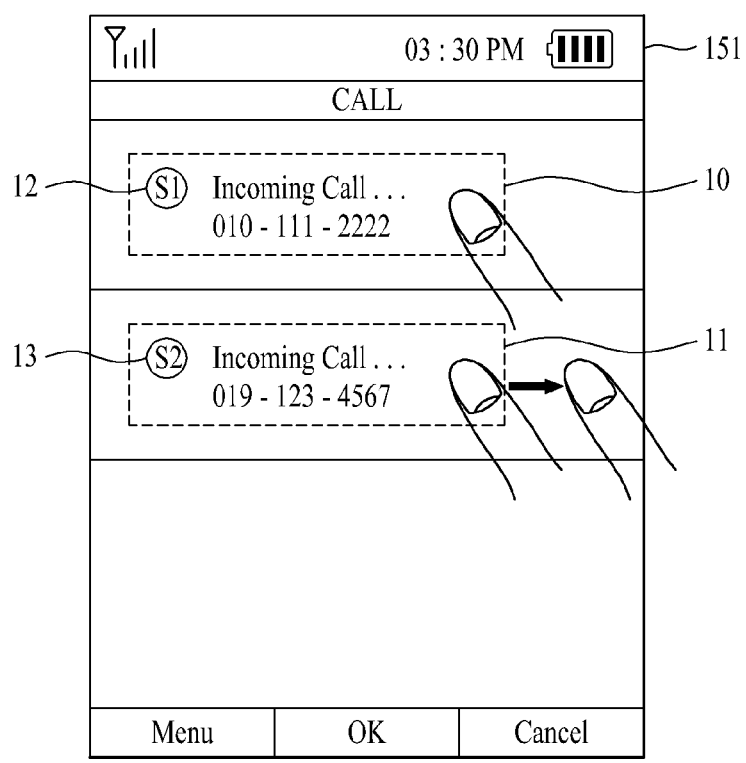

Further, for example, referring to FIG. 27, the user can input a third multi-touch action including a touch action of the first call reception indicator 10 and a drag action of the second call reception indicator 11.

Figure 28:
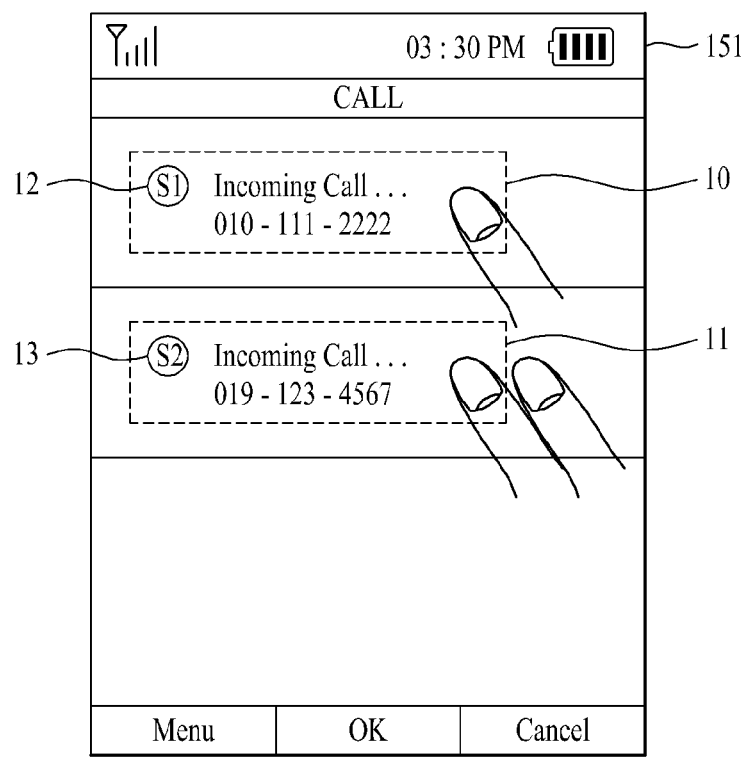

Further, for example, referring to FIG. 28, the user can input a four multi-touch action including a touch action of touching one time the first call reception indicator 10 and a touch action of touching two times the second call reception indicator 11.

The controller 180 connects the first call and rejects a connection to the second call according to the third multi-touch action or the four multi-touch action of the first and second call reception indicator 10 of the user.

Figure 29:
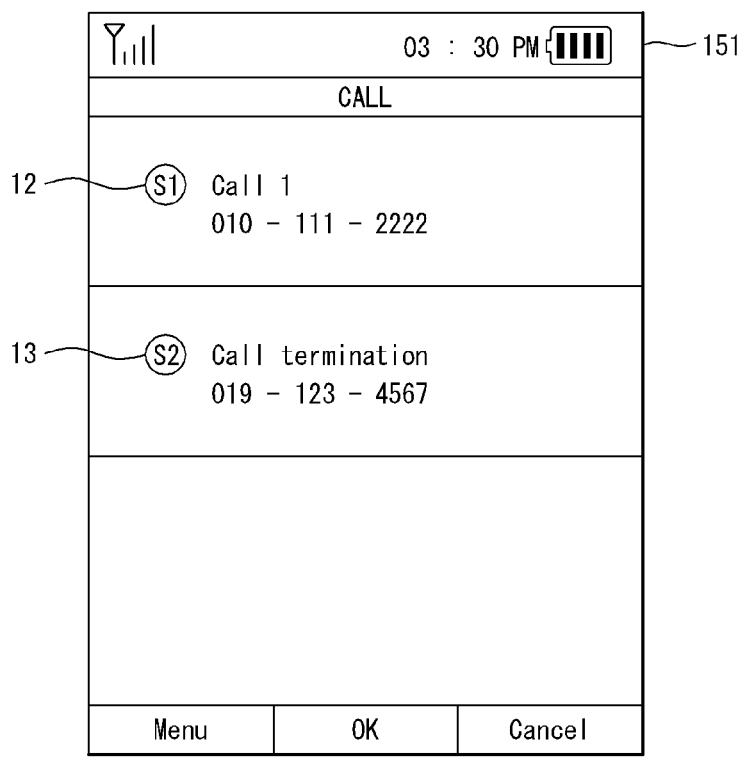

The controller 180 provides a screen shown in FIG. 29 on the touch screen 151 according to a connection of the first call and a rejection of the second call.

Figure 30:
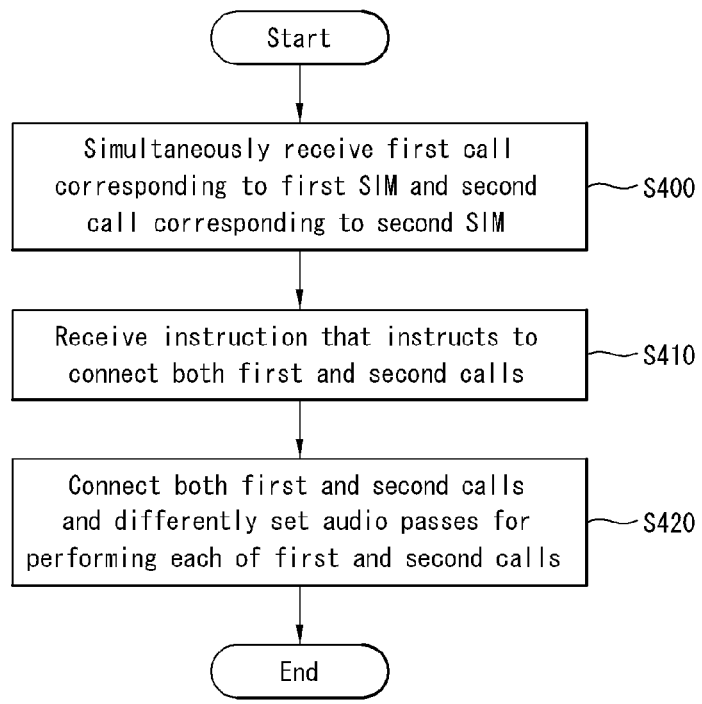
FIG. 30 is a flowchart illustrating a method of controlling a mobile terminal according to a fourth exemplary embodiment of the present invention.

FIG. 30 is a flowchart illustrating a method of controlling a mobile terminal according to a fourth exemplary embodiment of the present invention. FIGS. 31 to 40 are screen examples illustrating a method of controlling a mobile terminal according to a fourth exemplary embodiment of the present invention.

The method of controlling a mobile terminal according to a fourth exemplary embodiment of the present invention can be embodied in the mobile terminal 100 described with reference to FIG. 1. Hereinafter, a method of controlling a mobile terminal according to a fourth exemplary embodiment of the present invention and operation of the mobile terminal 100 for embodying the method will be described in detail with reference to necessary drawings.

Referring to FIG. 30, the controller 180 simultaneously receives a first call corresponding to the first SIM 171 and a second call corresponding to the second SIM 172 (S400). Step S400 corresponds to step S100 of the first exemplary embodiment according to the present invention.

The controller 180 receives an instruction that instructs to connect both the simultaneously received first and second calls (S410).

For example, as described with reference to FIGS. 23 and 24, the user can input an instruction that instructs to connect both the received first and second calls.

As an instruction that instructs to connect both the received first and second calls is received, the controller 180 connects both the first and second calls and differently sets audio passes for performing each of the first and second calls (S420).

The audio pass is a path for outputting an audio signal transmitted from another party of a call. The audio pass may include an input path for transmitting a voice of a user of the mobile terminal 100 to another party as well as an output path of an audio signal transmitted from another party of a call.

Figure 31:
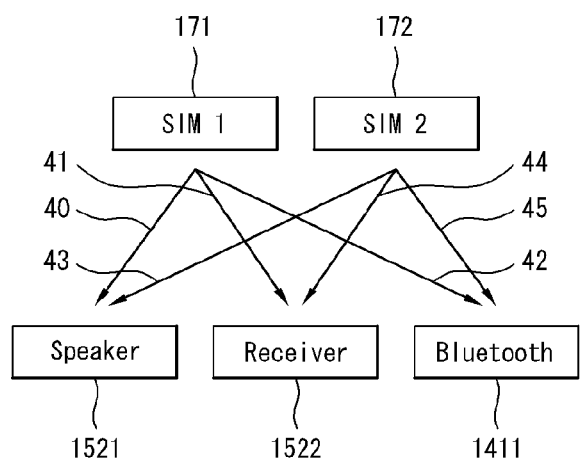
FIGS. 31 to 40 are screen examples illustrating a method of controlling a mobile terminal according to a fourth exemplary embodiment of the present invention.

FIG. 31 is a diagram illustrating an audio pass that can be set for the first and second calls corresponding to each of the first SIM 171 and the second SIM 172.

Referring to FIG. 31, the first SIM 171 and the second SIM 172 differently set audio passes 40, 41, 42, 43, 44, and 45 through a speaker 1521, a receiver 1522, and a Bluetooth 1411.

The Bluetooth 1411 is a Bluetooth module included in the short range communication module 114 and performs a function of an audio pass for transmitting an audio signal to an external device (e.g., an earphone or a headset having a Bluetooth module).

The Bluetooth 1411 is a kind of a short range communication method and the present invention does not exclude an audio pass using other short range communication methods.

For example, for the first call corresponding to the first SIM 171, the audio pass 40 is set to the speaker 1521, and for the second call corresponding to the second SIM 172, the audio pass 45 is set to the Bluetooth 1411.

When the first audio pass for the first call and the second audio pass for the second call are differently set, the controller 180 uses one of the first audio pass and the second audio pass as an audio pass that is set to a default, for example the receiver 1522 and provides the other one as a user interface to be selected by a user.

Figure 32:
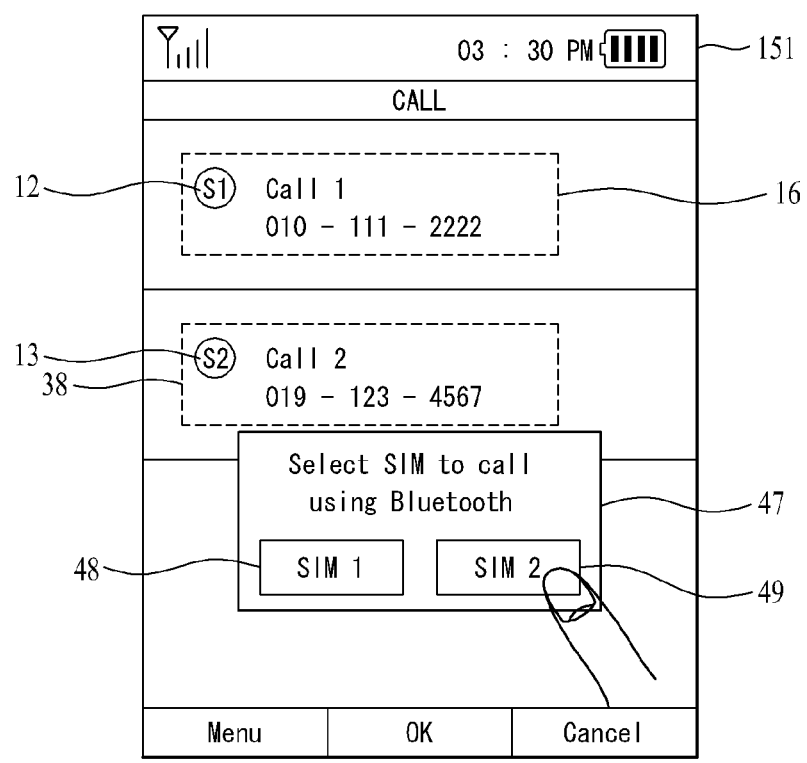

For example, referring to FIG. 32, the controller 180 provides a user interface 47 for inquiring an SIM to apply an audio pass using the Bluetooth 1411.

The user can select an SIM (or a corresponding call) to apply an audio pass using the Bluetooth 1411 by selecting one of icons 48 and 49 corresponding to the first SIM 171 and the second SIM 172, respectively, included in the user interface 47.

Figure 33:
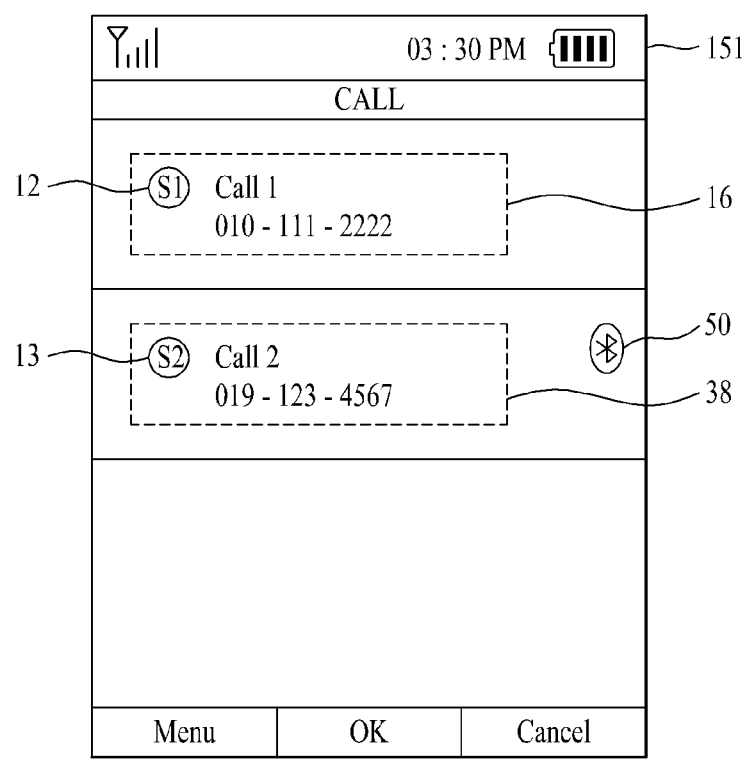

As shown in FIG. 32, when the user selects the icon 49 corresponding to the second SIM 172, the controller 180 controls to display an indicator 50 representing that the second audio pass corresponding to the second call uses the Bluetooth 1411 on the touch screen 151, as shown in FIG. 33.

When the first call and the second call are simultaneously received, the user can sequentially perform a connection to the first call and the second call.

Figure 34:
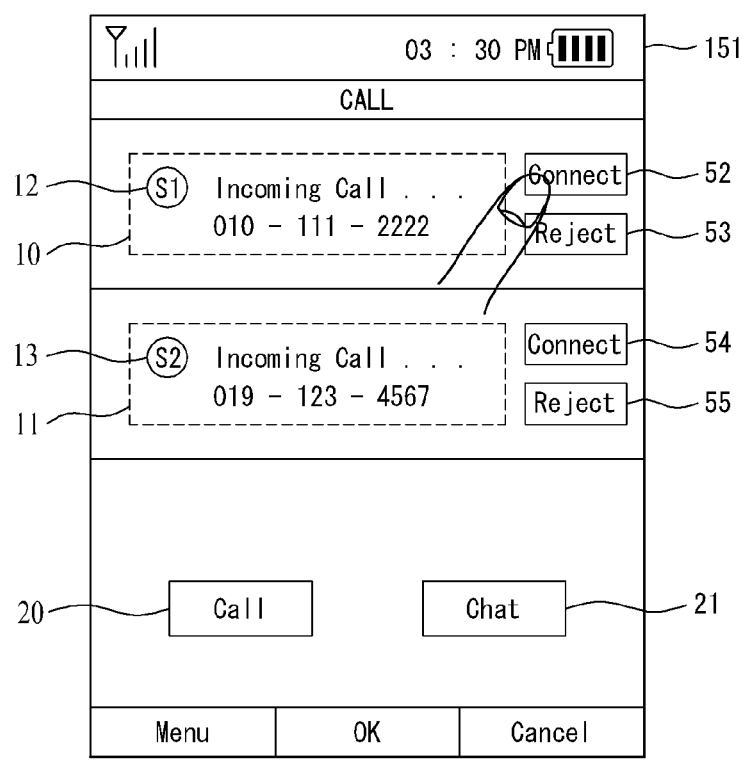

For example, referring to FIG. 34, the controller 180 displays connection icons 52 and 54 and rejection icons 53 and 55 corresponding to the simultaneously received first call and second call, respectively, on the touch screen 151.

The connection icons 52 and 54 correspond to a function of connecting a corresponding call, and the rejection icons 53 and 55 correspond to a function of rejecting a connection of a corresponding call.

Figure 35:
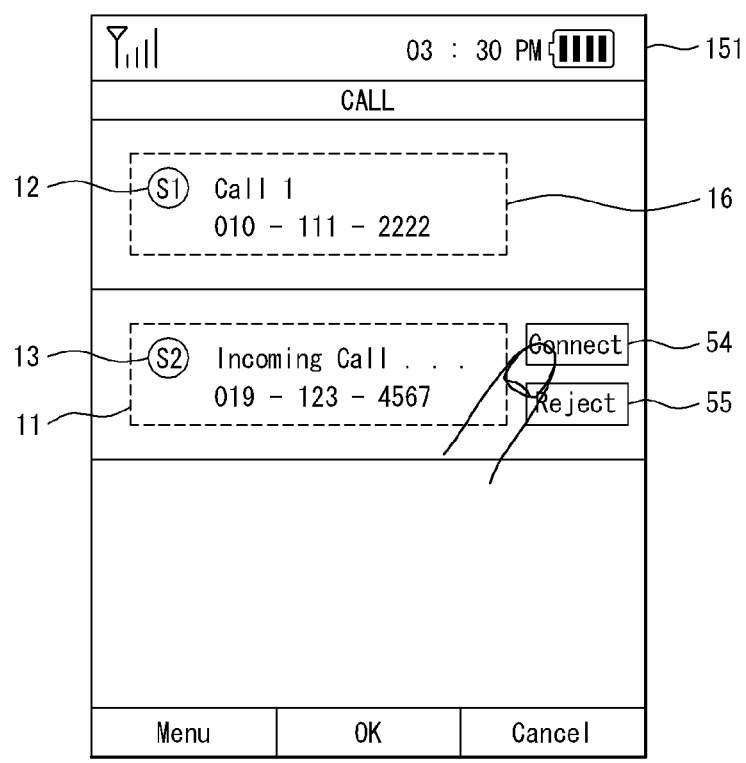

As shown in FIG. 34, the user connects the first call by selecting the first connection icon 52 corresponding to the received first call and connects the second call by selecting the second connection icon 54 corresponding to the received second call, as shown in FIG. 35, thereby sequentially connecting the first call and the second call.

The controller 180 sets an audio pass for the first call as an audio pass that is set to a default while connecting the first call. For example, the controller 180 sets an audio pass for the first call as the audio pass 41 using the receiver 1522 set to a default.

FIG. 35 illustrates a case of receiving an instruction for connecting the second call from a user when the first call has been already connected.

Figure 36:
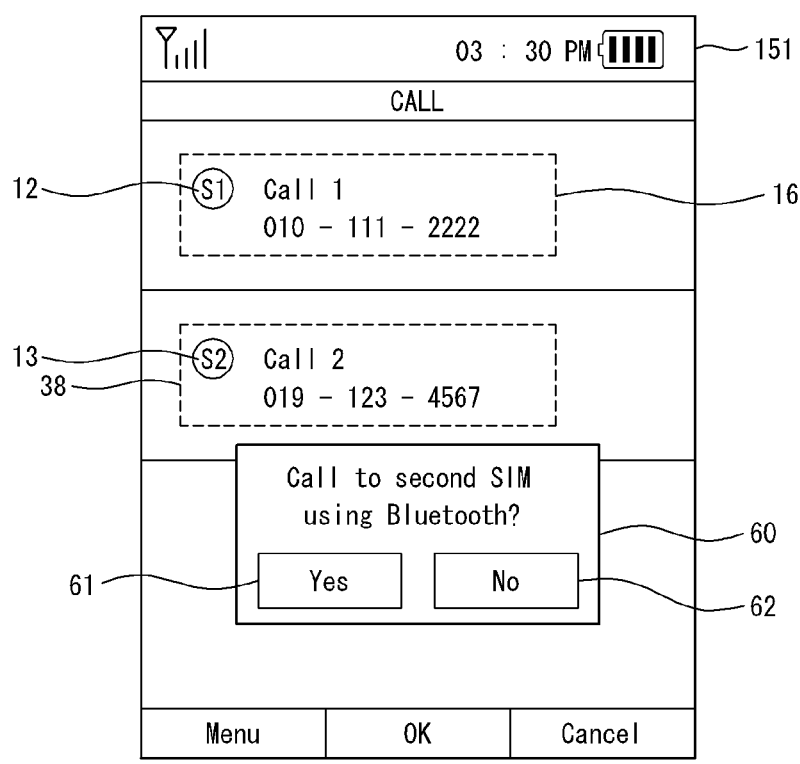

As shown in FIGS. 34 and 35, after the first call is connected, when a connection instruction of the second call is received, the controller 180 provides a user interface 60 inquiring whether to set an audio pass for the second call (or the second SIM 172) to the Bluetooth 1411 while connecting the second call, as shown in FIG. 36.

The user touches one of an acceptance icon 61 and a rejection icon 62 included in the user interface 60 and thus selects whether to apply an audio pass using the Bluetooth 1411 to the second call (or the second SIM 172).

Figure 37:
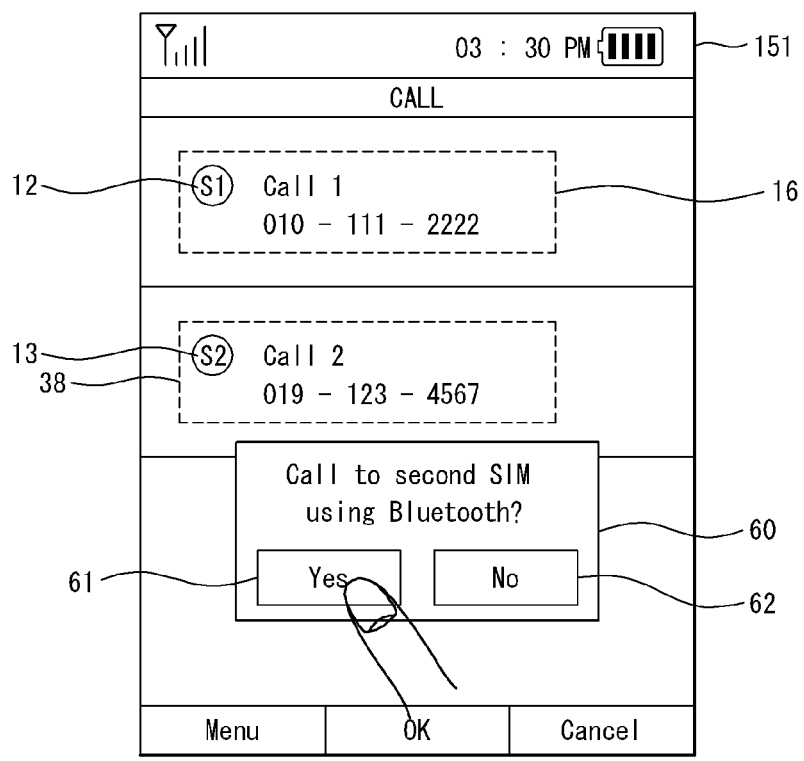

For example, referring to FIG. 37, the user can set the audio pass 45 using the Bluetooth 1411 for the second call by touching the acceptance icon 61.

Figure 38:
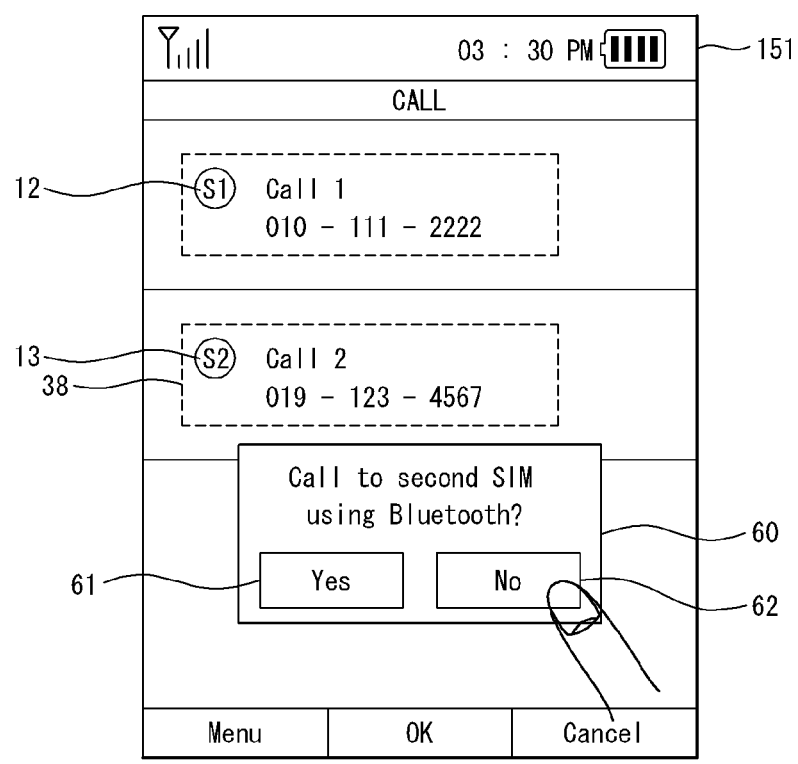

Further, for example, referring to FIG. 38, the user can reject to set the audio pass 45 using the Bluetooth 1411 for the second call by touching the rejection icon 62.

Figure 39:
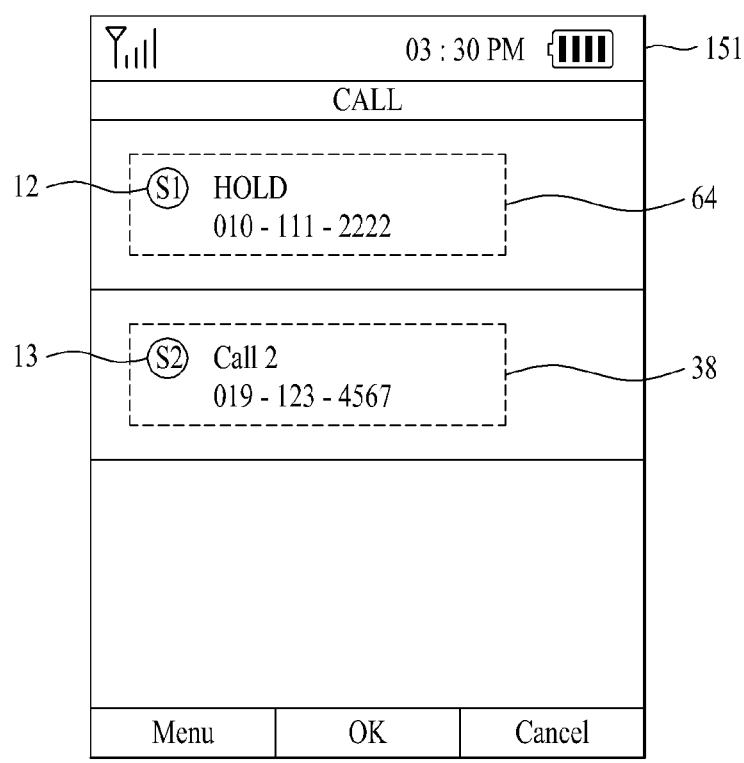

In this way, as shown in FIG. 38, when the user selects the rejection icon 62, the controller 180 holds the connected first call and sets an audio pass for the second call as the audio pass 44 using the receiver 1522 set to a default, as shown in FIG. 39.

Figure 40:
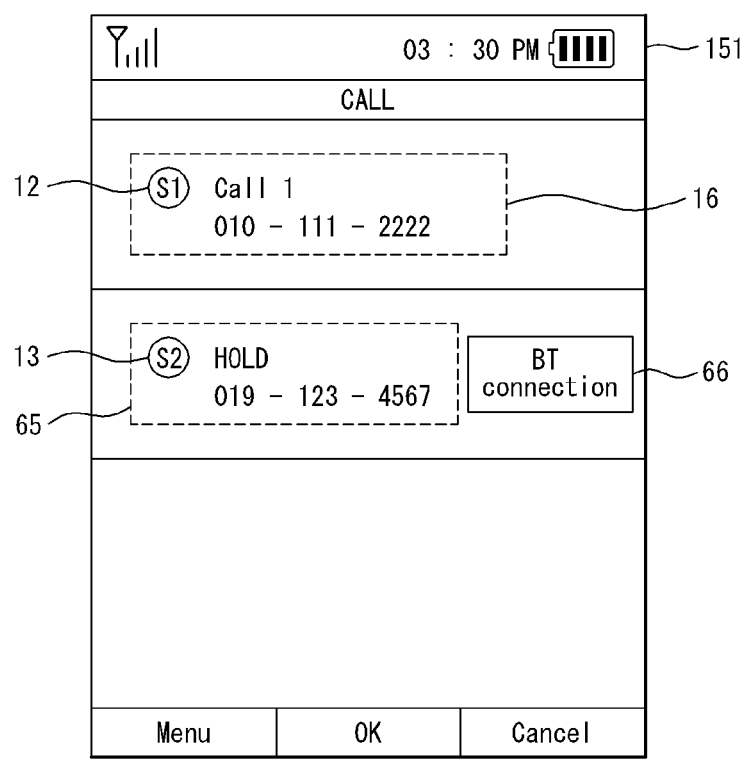

As described above, when one of the first call and the second call is in a holding state and the other one is set to an audio pass using the receiver 1522, the controller 180 provides an icon 66 corresponding to a function of setting an audio pass for a call in a holding state as an audio pass using the Bluetooth 1411, as shown in FIG. 40.

When the user selects the icon 66, while a holding state of the second call corresponding to the second SIM 172 is released, the audio pass for the second call is set as the audio pass 40 using the Bluetooth 1411.

Figure 41:
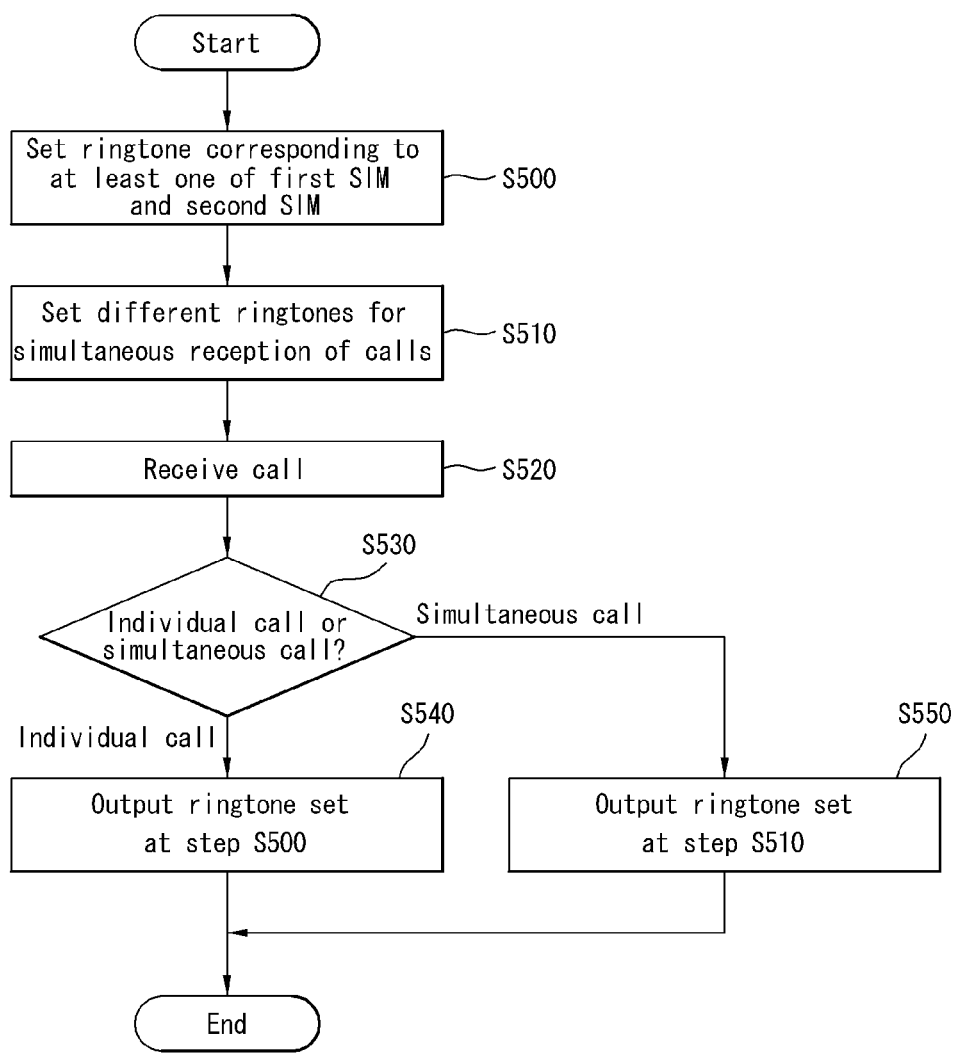
FIG. 41 is a flowchart illustrating a method of controlling a mobile terminal according to a fifth exemplary embodiment of the present invention.
Figure 42:
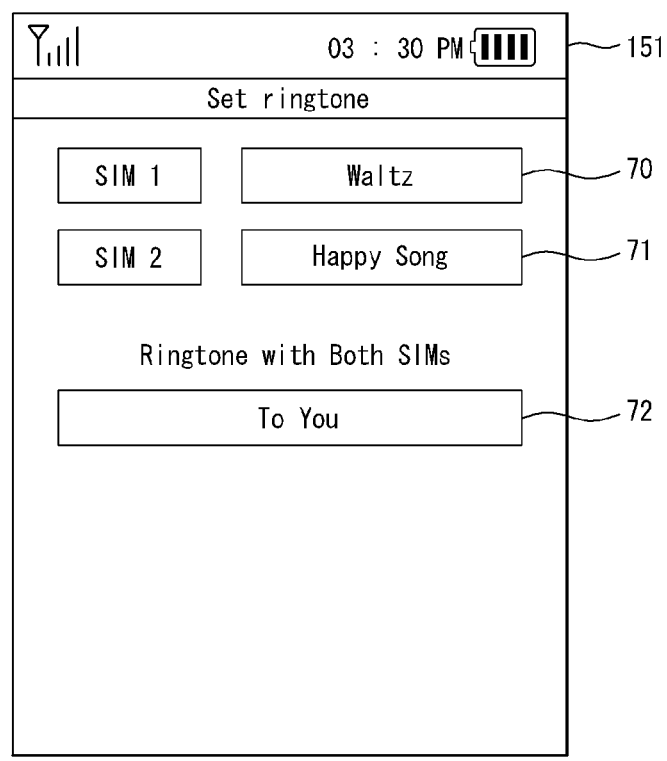
FIG. 42 illustrates a screen example illustrating a method of controlling a mobile terminal according to a fifth exemplary embodiment of the present invention.

FIG. 41 is a flowchart illustrating a method of controlling a mobile terminal according to a fifth exemplary embodiment of the present invention. FIG. 42 illustrates a screen example illustrating a method of controlling a mobile terminal according to a fifth exemplary embodiment of the present invention.

The method of controlling a mobile terminal according to a fifth exemplary embodiment of the present invention can be embodied in the mobile terminal 100 described with reference to FIG. 1. Hereinafter, a method of controlling a mobile terminal according to a fifth exemplary embodiment of the present invention and operation of the mobile terminal 100 for embodying the method will be described in detail with reference to necessary drawings.

Referring to FIG. 41, the controller 180 sets a ringtone corresponding to at least one of the first SIM 171 and the second SIM 172 (S500).

A ringtone performed at step S500 is preset to a default, or is set by a user.

FIG. 42 illustrates a screen example of setting a ringtone.

For example, referring to FIG. 42, the user sets a first ringtone 70 corresponding to the first SIM 171 and sets a second ringtone 71 corresponding to the second SIM 172.

Further, the controller 180 sets different ringtones corresponding to simultaneous reception of the first call and the second call corresponding to the first SIM 171 and the second SIM 172, respectively (S510).

For example, as shown in FIG. 42, the controller 180 may set a third ringtone 72 corresponding to simultaneous reception of the first call and the second call.

When a call is received (S520), the controller 180 determines whether the received call is an individual call that is individually received as a call corresponding to one of the first SIM 171 and the second SIM 172 or a simultaneous call in which the first call and the second call corresponding to the first SIM 171 and the second SIM 172, respectively, are simultaneously received (S530).

If the received call is an individual call, the controller 180 outputs a ringtone that is set at step S500 through the audio output module 152 (S540).

For example, according to setting of a ringtone shown in FIG. 42, when the first call corresponding to the first SIM 171 is individually received, the controller 180 outputs a first ringtone 70 through the audio output module 152.

Further, for example, when the second call corresponding to the second SIM 172 is individually received, the controller 180 outputs a second ringtone 71 through the audio output module 152.

If the received call is a simultaneous call at step S530, the controller 180 outputs a ringtone that is set at step S510 through the audio output module 152 (S550).

For example, according to setting of a ringtone shown in FIG. 42, when the first and second calls are simultaneously received, the controller 180 outputs a third ringtone 72 through the audio output module 152.

As described above, by hearing only a ringtone, the user can recognize whether an individual call, and if an individual call, a phone number in which a call is received, and whether a simultaneous call.

Figure 43:
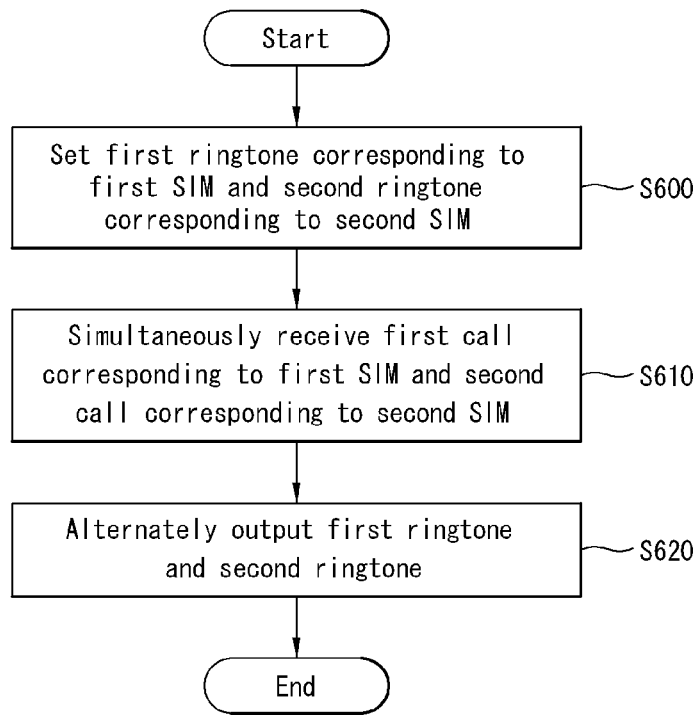
FIG. 43 is a flowchart illustrating a method of controlling a mobile terminal according to a sixth exemplary embodiment of the present invention.

FIG. 43 is a flowchart illustrating a method of controlling a mobile terminal according to a sixth exemplary embodiment of the present invention.

The method of controlling a mobile terminal according to a sixth exemplary embodiment of the present invention can be embodied in the mobile terminal 100 described with reference to FIG. 1. Hereinafter, a method of controlling a mobile terminal according to a sixth exemplary embodiment of the present invention and operation of the mobile terminal 100 for embodying the method will be described in detail with reference to necessary drawings.

Referring to FIG. 43, as describe above, the controller 180 sets a first ringtone corresponding to the first SIM 171 and a second ringtone corresponding to the second SIM 172 (S600).

The controller 180 simultaneously receives the first call corresponding to the first SIM 171 and the second call corresponding to the second SIM 172 (S610).

As the first and second calls are simultaneously received, the controller 180 alternately outputs the first ringtone and the second ringtone (S620).

For example, when the first ringtone and the second ringtone are set, as shown in FIG. 42, the controller 180 may alternately perform operation of outputting the first ringtone 70 for a first predetermined time period (e.g., two seconds) and operation of outputting the second ringtone 71 for a second predetermined time period (e.g., three seconds).

The first predetermined time period and the second predetermined time period may be equal or different and may be set by a user.

Figure 44:
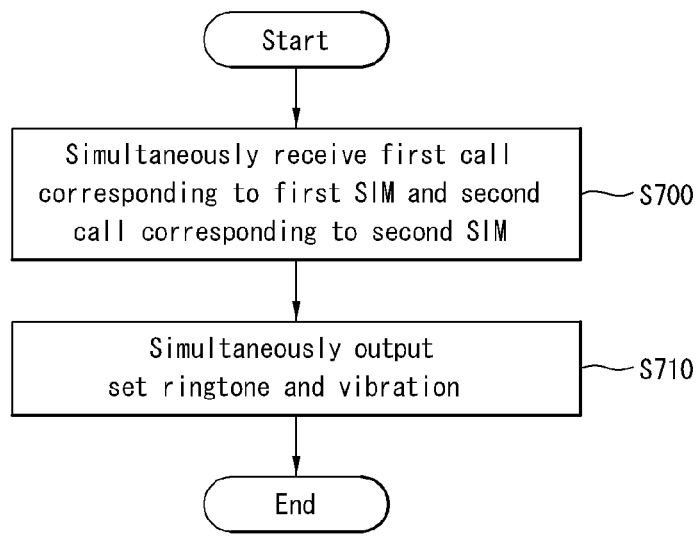
FIG. 44 is a flowchart illustrating a method of controlling a mobile terminal according to a seventh exemplary embodiment of the present invention.

FIG. 44 is a flowchart illustrating a method of controlling a mobile terminal according to a seventh exemplary embodiment of the present invention.

The method of controlling a mobile terminal according to a seventh exemplary embodiment of the present invention can be embodied in the mobile terminal 100 described with reference to FIG. 1. Hereinafter, a method of controlling a mobile terminal according to a seventh exemplary embodiment of the present invention and operation of the mobile terminal 100 for embodying the method will be described in detail with reference to necessary drawings.

Referring to FIG. 44, when the first call corresponding to the first SIM 171 and the second call corresponding to the second SIM 172 are simultaneously received (S700), the controller 180 simultaneously outputs a ringtone and a vibration that are set to correspond to call reception (S710). As described above, the vibration can be output through the haptic module 154.

Therefore, when a ringtone and a vibration are simultaneously output, the user can easily recognize that the first call and the second call are simultaneously received.

Figure 45:
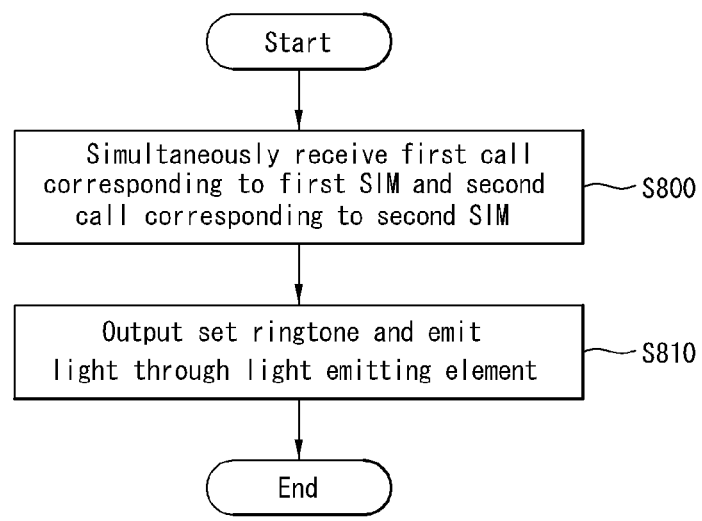
FIG. 45 is a flowchart illustrating a method of controlling a mobile terminal according to an eighth exemplary embodiment of the present invention.

FIG. 45 is a flowchart illustrating a method of controlling a mobile terminal according to an eighth exemplary embodiment of the present invention.

The method of controlling a mobile terminal according to an eighth exemplary embodiment of the present invention can be embodied in the mobile terminal 100 described with reference to FIG. 1. Hereinafter, a method of controlling a mobile terminal according to an eighth exemplary embodiment of the present invention and operation of the mobile terminal 100 for embodying the method will be described in detail with reference to necessary drawings.

Referring to FIG. 45, when the first call corresponding to the first SIM 171 and the second call corresponding to the second SIM 172 are simultaneously received (S800), the controller 180 controls the audio output module 152 to output a ringtone that is set to correspond to call reception and a light emitting element (e.g., a light emitting diode (LED)) provided in the mobile terminal 100 to emit light (S810).

A method of controlling a mobile terminal according to the present invention can record and provide data in a computer readable recording medium with a program for executing in a computer.

A method of controlling a mobile terminal according to the present invention can be executed through software. When the method is executed with software, constituent means of the present invention are code segments that execute a necessary operation. Programs or code segments can be stored in a processor readable medium or be transmitted by a computer data signal coupled to carrier waves in a transmission medium or a communication network.

A computer readable recording medium includes all kinds of recording devices in which data that can be read by a computer system are stored. The computer readable recording medium may include, for example, a ROM, a RAM, a CD-ROM, a DVD±ROM, a DVD-RAM, a magnetic tape, a floppy disk, a hard disk, and an optical data storage device. Further, the computer readable recording medium is distributed to a computer system connected to a network and may be stored and executed with a computer readable code in a distributed manner.

A mobile terminal and a method of controlling the same according to the present invention obtain the following effects.

According to the present invention, when calls are simultaneously received to a plurality of phone numbers corresponding to each of a plurality of SIMs corresponding to different phone numbers, a user can desirably and efficiently control the simultaneously received calls.

Further, when calls are simultaneously received, simultaneous reception of calls can be effectively notified to a user.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A mobile terminal comprising:
a plurality of user identify modules (SIMs) corresponding to different phone numbers; and
a controller configured to differently set audio passes for performing each of a first call and a second call of a plurality of calls, when the plurality of calls including the first call and the second call corresponding to at least two of the plurality of SIMs are simultaneously received when the first and second calls are received or prior to receiving the first and second calls, wherein the audio passes correspond to paths for outputting an audio signal of the received plurality of calls.

2. The mobile terminal of claim 1, further comprising:
a receiver, wherein the controller is further configured to set a first audio pass from the audio passes for performing the first call to the receiver, and to set a second audio pass from the audio passes for performing the second call with a short range wireless communication.

3. The mobile terminal of claim 1, wherein the controller is further configured to perform a first operation of connecting the first call of the received plurality of calls and a second operation of entering a chat mode with another party corresponding to the second call of the received plurality of calls different from the first call.

4. The mobile terminal of claim 1, wherein when an instruction to perform one of the first operation and the second operation is received, the controller is configured to perform the one of the first operation and the second operation corresponding to the received instruction, and automatically and simultaneously perform the other of the one of the first operation and the second operation.

5. The mobile terminal of claim 1, wherein the controller is configured to display a plurality of indicators, each of the plurality of indicators corresponding to each of the received plurality of calls, on a touch screen, and to perform the first operation and the second operation to correspond to a touch manipulation of the plurality of indicators.

6. The mobile terminal of claim 5, wherein the controller is configured to provide an icon corresponding to the chat mode on the touch screen and to perform the second operation, when a touch of an indicator from the plurality of indicators corresponding to the second call moves to the icon or when a touch of the icon moves to the indicator corresponding to the second call.

7. The mobile terminal of claim 5, wherein the each of the plurality of indicators comprises an icon representing the chat mode with another party who sends a corresponding call.

8. The mobile terminal of claim 1, wherein the controller is configured to automatically try a call connection to another party corresponding to the second call or to provide a user interface for the call connection, when the first call is terminated.

9. The mobile terminal of claim 1, further comprising:
a user interface, wherein the controller is configured to control the user interface to enter the chat mode with another party corresponding to one of the received plurality of calls.

10. The mobile terminal of claim 1, wherein the controller is configured to output a first notification and a second notification different from the first notification, and the first and second notifications are set to notify that at least two among the plurality of received calls are received.

11. The mobile terminal of claim 10, wherein the first and second notifications are set as one of the following:
the first and second notifications set to different ring tones from each other, wherein the first and second notifications are alternatively output;
the first notification set to a ring tone and the second notification set to vibrate, wherein the first and second notifications are simultaneously output; or
the first notification set to a ring tone and the second notification set to emit light through a light emitting element, wherein the first and second notifications are simultaneously output.

12. The mobile terminal of claim 10, wherein the controller is configured to provide a user interface for setting different ring tones for outputting the calls, when the plurality of calls are simultaneously received.

13. A method of controlling a mobile terminal having a plurality of user identify modules (SIMs) corresponding to different phone numbers, the method comprising:
simultaneously receiving, via the mobile terminal, a plurality of calls including a first call and a second call corresponding to at least two of the plurality of SIMs; and
differently setting audio passes for performing each of the first call and the second call of the plurality of calls when the first and second calls are received or prior to receiving the first and second calls, wherein the audio passes correspond to paths for outputting an audio signal of the received plurality of calls.

14. The method of claim 13, wherein the differently setting step comprises:
setting a first audio pass from the audio passes for performing the first call to a receiver provided in the mobile terminal; and
setting a second audio pass from the audio passes for performing the second call with a short range wireless communication.

* * * * *